US011628354B2

(12) United States Patent
Berns et al.

(10) Patent No.: US 11,628,354 B2
(45) Date of Patent: Apr. 18, 2023

(54) PEDAL SYSTEM FOR GAMING APPARATUS

(71) Applicant: Arkade, Inc., Van Nuys, CA (US)

(72) Inventors: Bob Steven Berns, Van Nuys, CA (US); Joel Abraham Kort, Van Nuys, CA (US); Joshua Allan Fuchs, Granada Hills, CA (US); Michael Harold Pachter, Long Beach, CA (US)

(73) Assignee: Arkade, Inc., Van Nuys, CA (US)

( * ) Notice: Subject to any disclaimer, the term of this patent is extended or adjusted under 35 U.S.C. 154(b) by 284 days.

(21) Appl. No.: 16/889,643

(22) Filed: Jun. 1, 2020

(65) Prior Publication Data

US 2020/0330859 A1  Oct. 22, 2020

Related U.S. Application Data

(63) Continuation-in-part of application No. PCT/US2019/065200, filed on Dec. 9, 2019, which is
(Continued)

(51) Int. Cl.
*A63F 13/245* (2014.01)
*A63F 13/23* (2014.01)
(Continued)

(52) U.S. Cl.
CPC ............ *A63F 13/245* (2014.09); *A63F 13/23* (2014.09); *A63F 13/537* (2014.09);
(Continued)

(58) Field of Classification Search
CPC ........ A63F 13/245; A63F 13/23; A63F 13/92; A63F 2300/1043
See application file for complete search history.

(56) References Cited

U.S. PATENT DOCUMENTS 5,608,196 A * 3/1997 Hall ..................... H01H 3/0213
200/61.19
5,753,874 A * 5/1998 Kossakowski ....... H01H 23/003
200/557
(Continued)

FOREIGN PATENT DOCUMENTS

CN 303051008 12/2014
CN 303826973 8/2016
(Continued)

OTHER PUBLICATIONS

Nuriho. "Is there a way to press PS4 touchpad's sides?" gimx.fr. Online. Sep. 12, 2018. Accessed via the Internet. Accessed May 7, 2022. <URL: http://gimx.fr/forum/viewtopic.php?t=2741> (Year: 2018).*
(Continued)

*Primary Examiner* — Thomas J Hong
*Assistant Examiner* — Carl V Larsen
(74) *Attorney, Agent, or Firm* — Volpe Koenig P.C.; Daniel E. Rose

(57) ABSTRACT

A gaming controller includes a pedal system, and a communications interface. The pedal system is disposed on a rear facing portion of the gaming controller. The pedal system includes a pedal disposed along the rear facing surface of outer portions or wings of the gaming controller. The pedal has a first end proximate the elongated portion and an opposing second end spaced from the elongated portion. The pedal is coupled to a pivot point within the controller such that the pedal is selectively pivotable between a nominal position, a first position, and a second position. The communications interface is configured to facilitate transmitting inputs to the portable gaming device based on a current position of the pedal.

19 Claims, 14 Drawing Sheets

Related U.S. Application Data a continuation of application No. 16/271,757, filed on Feb. 8, 2019, now Pat. No. 10,471,345.

(51) Int. Cl.
*A63F 13/837* (2014.01)
*A63F 13/537* (2014.01)
*A63F 13/98* (2014.01)
*A63F 13/92* (2014.01)

(52) U.S. Cl.
CPC ............ *A63F 13/837* (2014.09); *A63F 13/92* (2014.09); *A63F 13/98* (2014.09); *A63F 2300/1043* (2013.01); *A63F 2300/1062* (2013.01); *A63F 2300/8076* (2013.01)

(56) References Cited

U.S. PATENT DOCUMENTS

| | | | |
|---|---|---|---|
| 6,178,841 B1* | 1/2001 | Ruckert | G05G 5/005 74/471 XY |
| 6,760,013 B2 | 7/2004 | Willner et al. | |
| 9,713,768 B2* | 7/2017 | Uy | G06F 3/0362 |
| 10,427,036 B2 | 10/2019 | Burgess et al. | |
| 10,471,345 B1 | 11/2019 | Fuchs et al. | |
| 10,736,700 B2 | 8/2020 | Mercado | |
| 10,742,436 B2 | 8/2020 | Franke et al. | |
| 2002/0128064 A1* | 9/2002 | Sobota | A63F 13/06 463/37 |
| 2004/0147317 A1 | 7/2004 | Ito et al. | |
| 2005/0083297 A1 | 4/2005 | Duncan | |
| 2009/0102628 A1* | 4/2009 | Takebayashi | B62M 25/08 340/432 |
| 2010/0144437 A1 | 6/2010 | Gray | |
| 2010/0311504 A1* | 12/2010 | Deegan | A63F 13/24 463/38 |
| 2014/0035888 A1 | 2/2014 | Levasseur et al. | |
| 2017/0085103 A1* | 3/2017 | Seng | H02J 7/00 |
| 2017/0087456 A1* | 3/2017 | Burgess | A63F 13/21 |
| 2018/0207523 A1* | 7/2018 | Lyden | A63F 13/214 |
| 2019/0163226 A1 | 5/2019 | Kihara et al. | |
| 2020/0085515 A1 | 3/2020 | Jawidzik | |
| 2020/0398153 A1* | 12/2020 | Ironmonger | A63F 13/428 |

FOREIGN PATENT DOCUMENTS

| | | |
|---|---|---|
| CN | 305161445 | 5/2019 |
| JP | D1581313 | 7/2017 |
| JP | D1660012 | 5/2020 |
| JP | D1668775 | 9/2020 |
| JP | D1671060 | 10/2020 |
| WO | WO-96/13001 | 5/1996 |
| WO | WO-2020/254824 | 12/2020 |

OTHER PUBLICATIONS

Anonymous, "J3R 'Rocker' Potentiometer," retrieved from the Internet: URL:https://web.archive.org/web/20190619103309/http://www.precisionsales.com/joystick/J3r-rocker-pot.htm, retrieved on Sep. 7, 2021, 1 page.

International Search Report and Written Opinion for International Application No. PCT/US2019/065200, dated Jan. 17, 2020, 7 pages.

PS Vita—Rear Touch Features Dec. 16, 2020, from URL link: https://www.youtube.com/watch?v=DGXIQYMWG50 Feb. 23, 2012.

* cited by examiner

PEDAL SYSTEM FOR GAMING APPARATUS

CROSS-REFERENCE TO RELATED APPLICATIONS

This applications claims the benefit of and priority as a continuation in part to P.C.T. Application No. PCT/US2019/065200, filed Dec. 9, 2019, which claims priority to U.S. application Ser. No. 16/271,757, filed Feb. 8, 2019, each of which is hereby incorporated by reference herein in its entirety.

BACKGROUND

A video game console typically uses a remote controller to allow a user to interact with a game being operated by the video game console. With the emergence of portable electronic user devices (e.g., smartphones, tablets, portable gaming consoles, etc.), the control functionality has been incorporated directly into interfaces (e.g., touchscreens, physical buttons, physical joysticks, etc.) of the portable electronic user devices. However, such interfaces are not ideal for the avid gamer, as traditional control interfaces on portable electronic user devices are difficult to use.

SUMMARY

One embodiment relates to a gaming controller for a portable gaming device. The gaming controller includes a handgrip, an elongated portion, a pedal system, and a communications interface. The handgrip has a forward facing surface that defines an aperture. The handgrip defines a pivot point along the aperture. The elongated portion extends from the handgrip, forward of the forward facing surface. The pedal system is disposed within the aperture of the handgrip. The pedal system includes a pedal disposed along the forward facing surface of the handgrip. The pedal has a first end proximate the elongated portion and an opposing second end spaced from the elongated portion. The pedal is coupled to the pivot point of the handgrip such that the pedal is selectively pivotable between (i) a nominal position, (ii) a first position in response to the pedal being pivoted in a first direction about the pivot point, and (iii) a second position in response to the pedal being pivoted in an opposing second direction about the pivot point. The communications interface is configured to facilitate transmitting inputs to the portable gaming device based on a current position of the pedal.

Another embodiment relates to a gaming controller for a gaming device. The gaming controller includes a body, a pedal system coupled to the body, and a communications interface. The pedal system includes a pedal that is pivotally coupled to the body such that the pedal is selectively pivotable between a plurality of positions. The communications interface is configured to facilitate transmitting inputs to the gaming device based on a current position of the pedal.

Still another embodiment relates to a gaming apparatus. The gaming apparatus includes a handgrip, an elongated portion, and a pedal system. The handgrip has a forward facing surface that defines an aperture. The handgrip defines a pivot point along the aperture. The elongated portion extending from the handgrip, forward of the forward facing surface. The pedal system is disposed within the aperture of the handgrip. The pedal system includes a pedal coupled to the pivot point of the handgrip such that the pedal is selectively pivotable between a plurality of positions. A command based on a current position of the pedal is useable to control operation within a game associated with the gaming apparatus.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
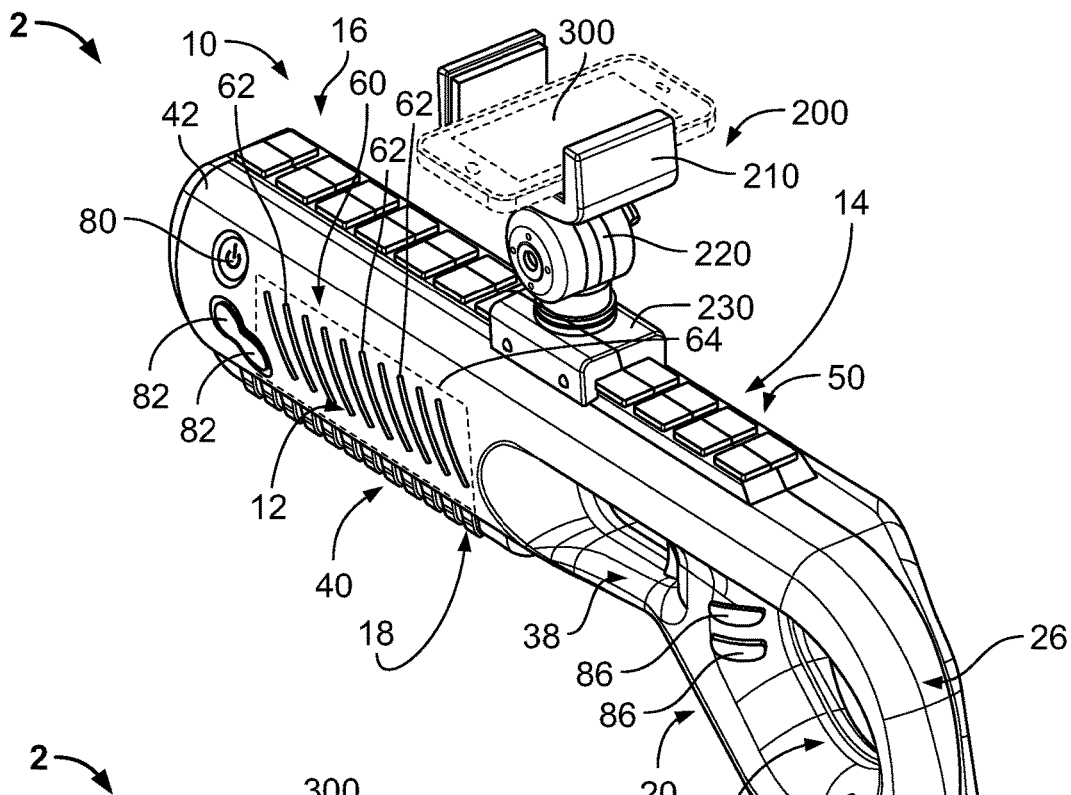
FIG. 1 is a rear perspective view of a gaming apparatus having a pedal system, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to the exemplary embodiment shown in FIGS. 1-14, an apparatus, shown as gaming apparatus 2, includes (i) a controller, shown as gaming controller 10, having an input system, shown as pedal system 100, (ii) a support, shown as mount 200, and (iii) an output device, shown as display device 300.

As shown in FIGS. 1-4, the gaming controller 10 has a body having a first lateral side, shown as left side 12, an opposing second lateral side, shown as right side 14, a top portion, shown as top side 16, and a lower portion, shown as lower side 18. As shown in FIGS. 1-4, the body of the gaming controller 10 includes first portion, shown as rear portion 20, and a second portion, shown as elongated portion 40 (e.g., a barrel, etc.), extending from the rear portion 20. According to the exemplary embodiment shown in FIGS. 1-4, the body of the gaming controller 10 is structured or shaped to resemble a "large blaster" device (e.g., a shotgun, a rifle, a machine gun, a grenade launcher, a rocket launcher, etc.). In some embodiments, the elongated portion 40 is shortened such that the gaming controller 10 is structured or shaped to resemble a "small blaster" device (e.g., a pistol, etc.).

As shown in FIGS. 1-13, the rear portion 20 has a handgrip body, shown as handgrip 22. As shown in FIGS. 1-4, the handgrip 22 has a first surface, shown as forward facing surface 24; has an opposing second surface, shown as rearward facing surface 26; and defines an aperture, shown as thumb aperture 28, positioned between the forward facing surface 24 and the rearward facing surface 26 that extends through the handgrip 22. According to an exemplary embodiment, the forward facing surface 24 of the handgrip 22 is positioned to be a resting place for the fingers of a user's hand while holding the gaming controller 10. According to an exemplary embodiment, the rearward facing surface 26 is positioned and shaped to function as a stock that rests upon a user's shoulder. According to an exemplary embodiment, the thumb aperture 28 is positioned to receive the thumb of a user's hand while holding the gaming controller 10. In other embodiments, the handgrip 22 does not define the thumb aperture 28 and/or the rearward facing surface 26 is selectively removable such that the handgrip 22 is structured or shaped like a traditional pistol handgrip. As shown in FIGS. 1-4, the left side 12 and the right side 14 of the handgrip 22 have curved surfaces, shown as contoured sidewalls 30. According to an exemplary embodiment, the contoured sidewalls 30 of the handgrip 22 are ergonomically shaped such that the handgrip 22 fits comfortably in the hand of a user.

Figure 11:
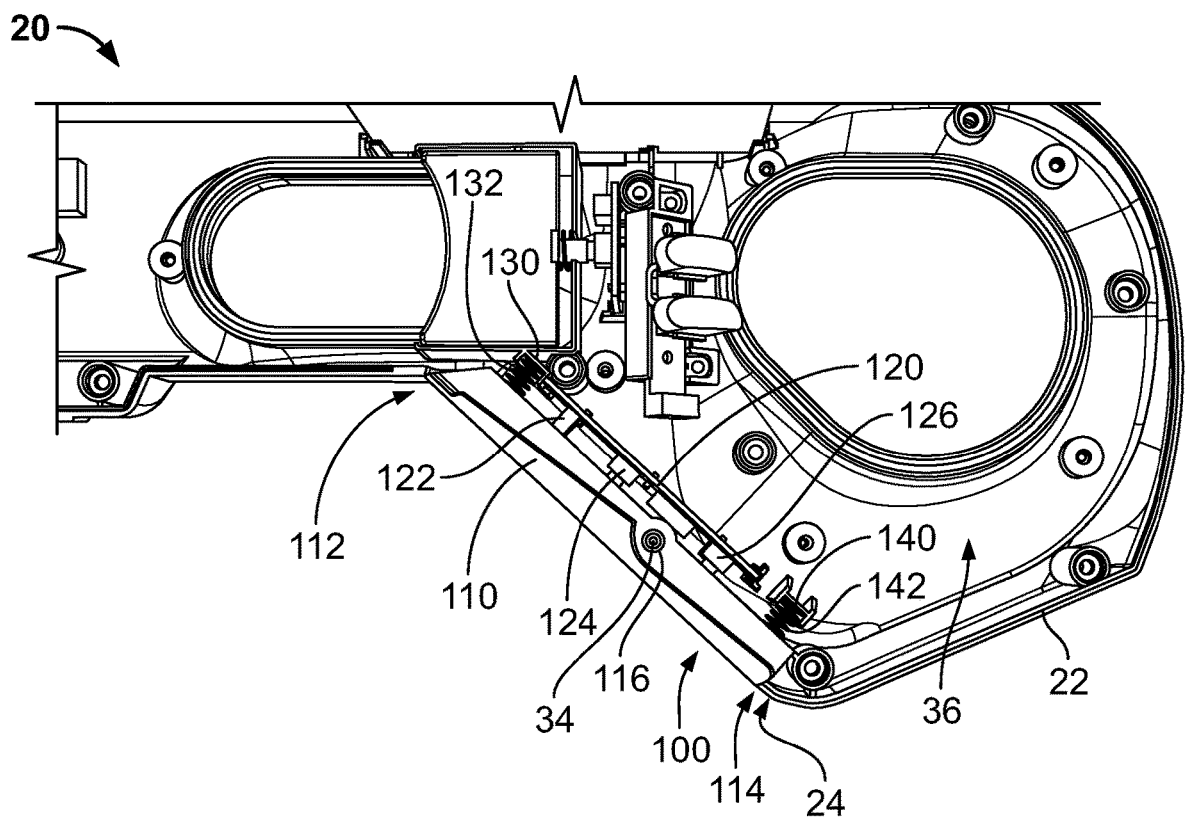
FIG. 11 is a first detailed, side, cross-sectional view of the gaming apparatus of FIG. 1, according to an exemplary embodiment.
Figure 12:
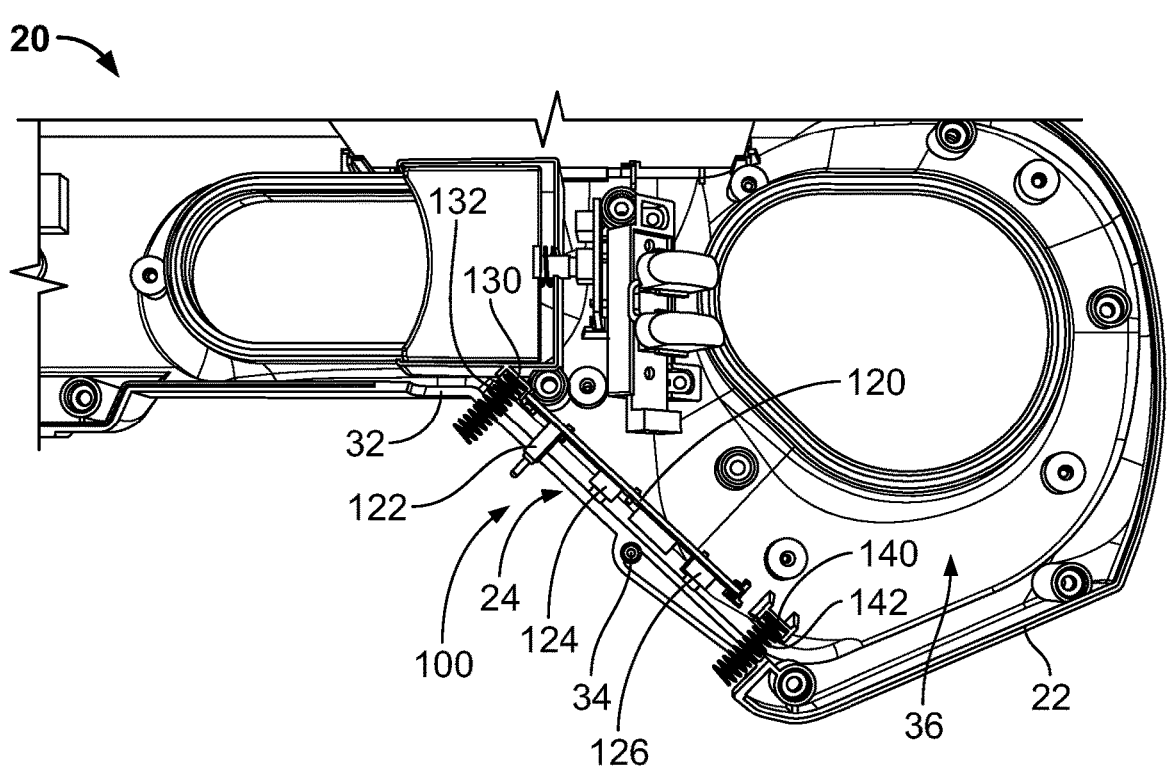
FIG. 12 is a second detailed, side, cross-sectional view of the gaming apparatus of FIG. 1, according to an exemplary embodiment.
Figure 13:
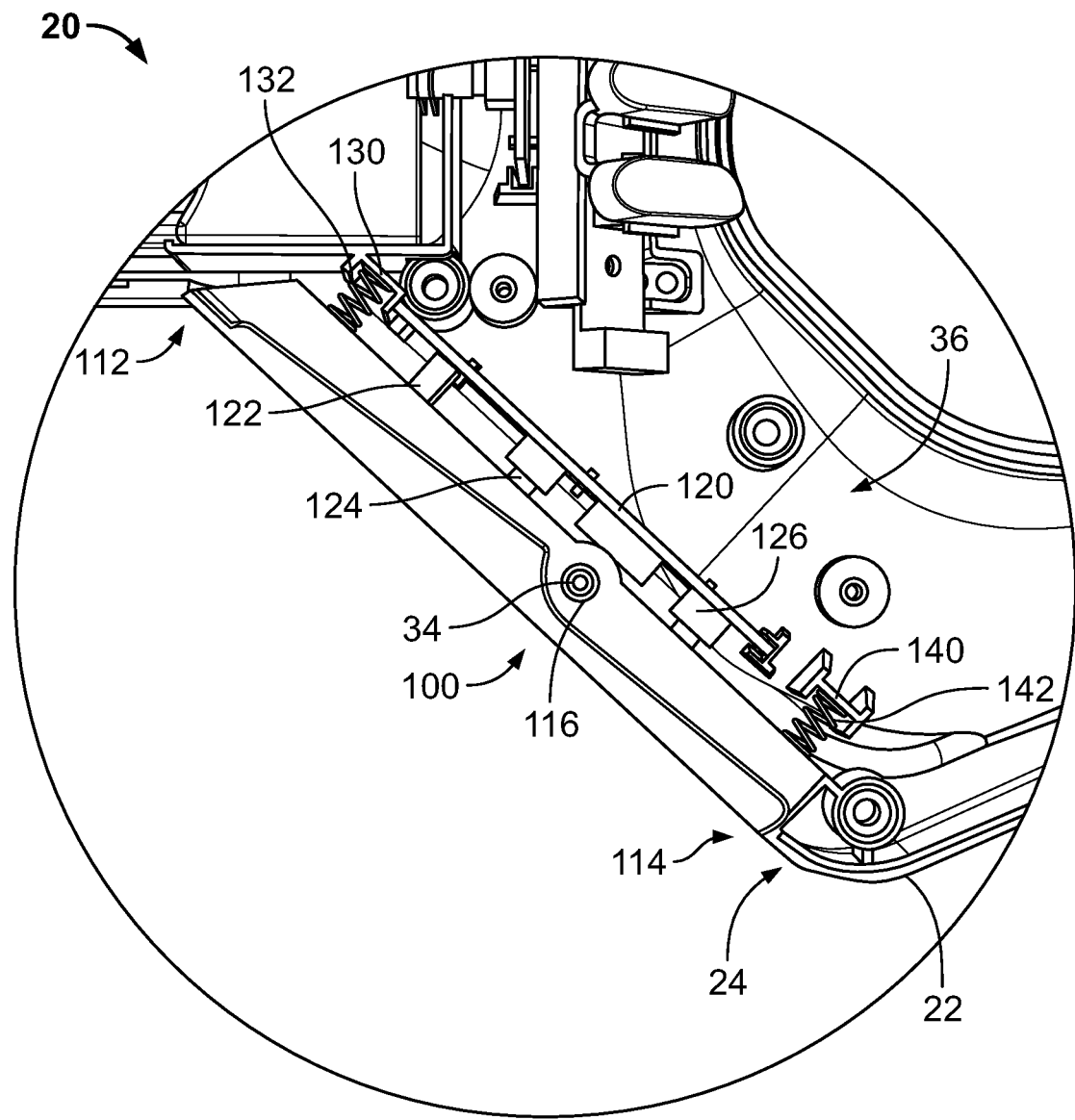
FIG. 13 is a detailed view of the pedal system of the gaming apparatus of FIG. 11, according to an exemplary embodiment.

As shown in FIGS. 1-8 and 12, the forward facing surface 24 of the handgrip 22 defines an aperture, shown as pedal aperture 32, that receives one or more components of the pedal system 100. As shown in FIGS. 11-13, the handgrip 22 defines a pivot point, shown as pivot 34, positioned along the pedal aperture 32. According to an exemplary embodiment, the pivot 34 is configured to facilitate pivotally coupling a component of the pedal system 100 to the handgrip 22, as described in more detail herein. As shown in FIGS. 9-13, the rear portion 20 (and the elongated portion 40) defines an internal chamber, shown as interior chamber 36 (i.e., portions between the left side 12 and the right side 14 of the rear portion 20 and the elongated portion 40 are hollow). According to an exemplary embodiment, the interior chamber 36 receives various components of the gaming controller 10 (e.g., light elements, a communication device, a control unit, components of the pedal system 100, etc.) as described in more detail herein.

Figure 2:
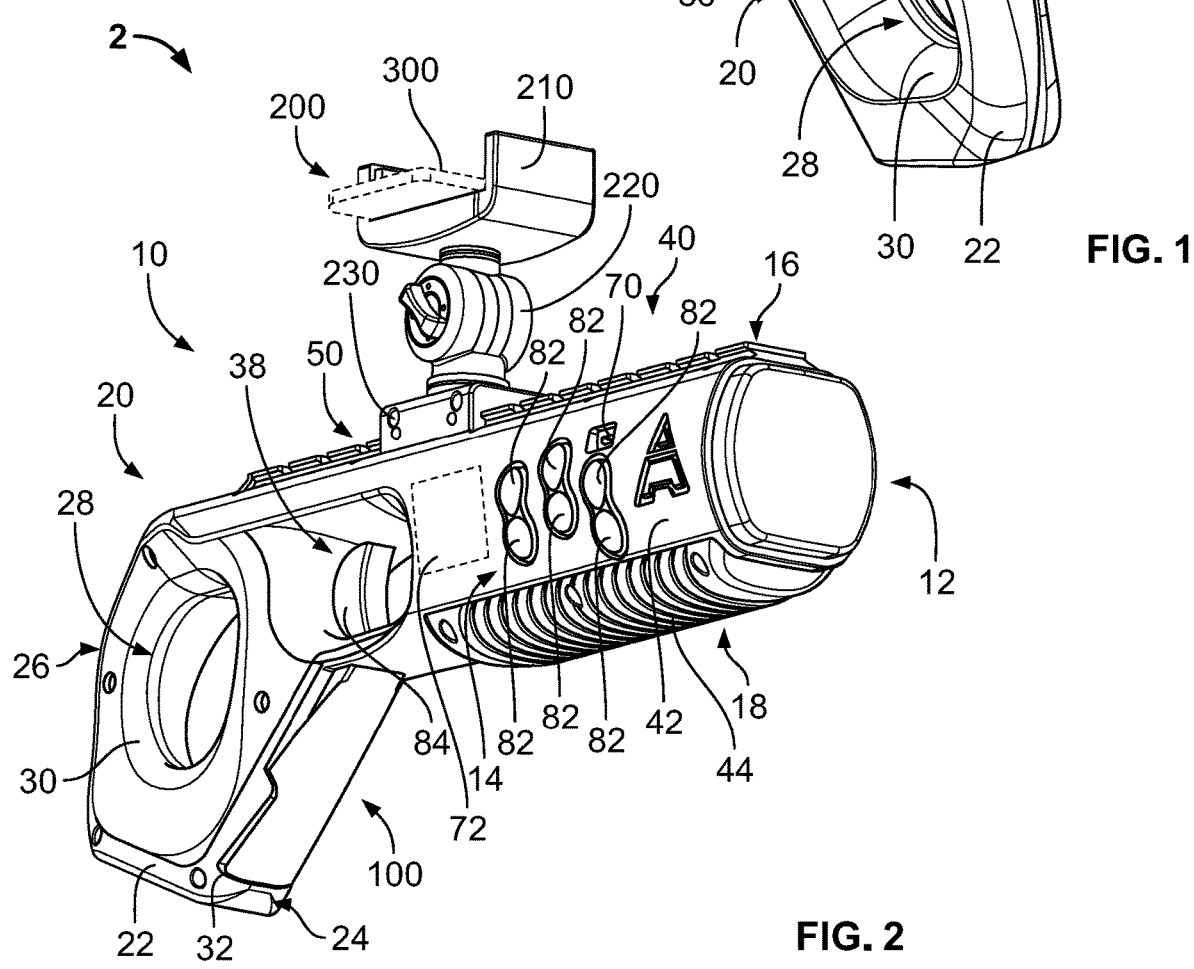
FIG. 2 is a front perspective view of the gaming apparatus of FIG. 1, according to an exemplary embodiment.
Figure 3:
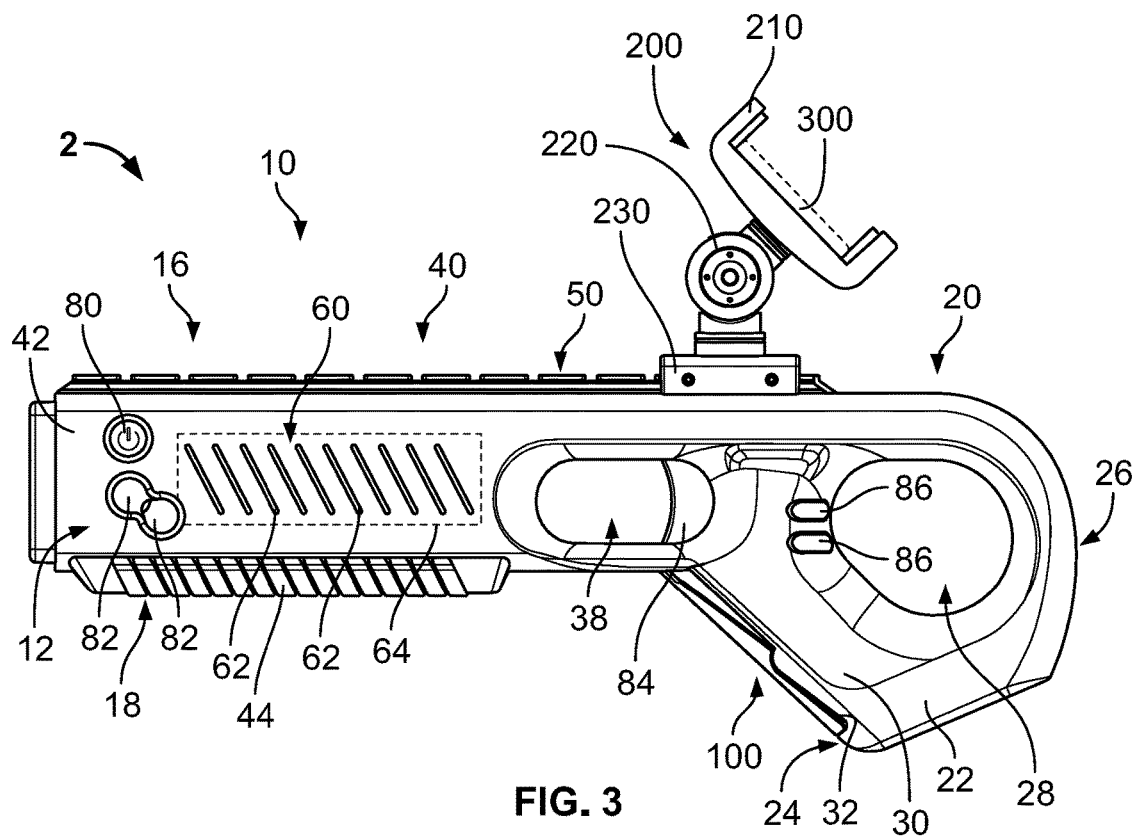
FIG. 3 is a left view of the gaming apparatus of FIG. 1, according to an exemplary embodiment.
Figure 4:
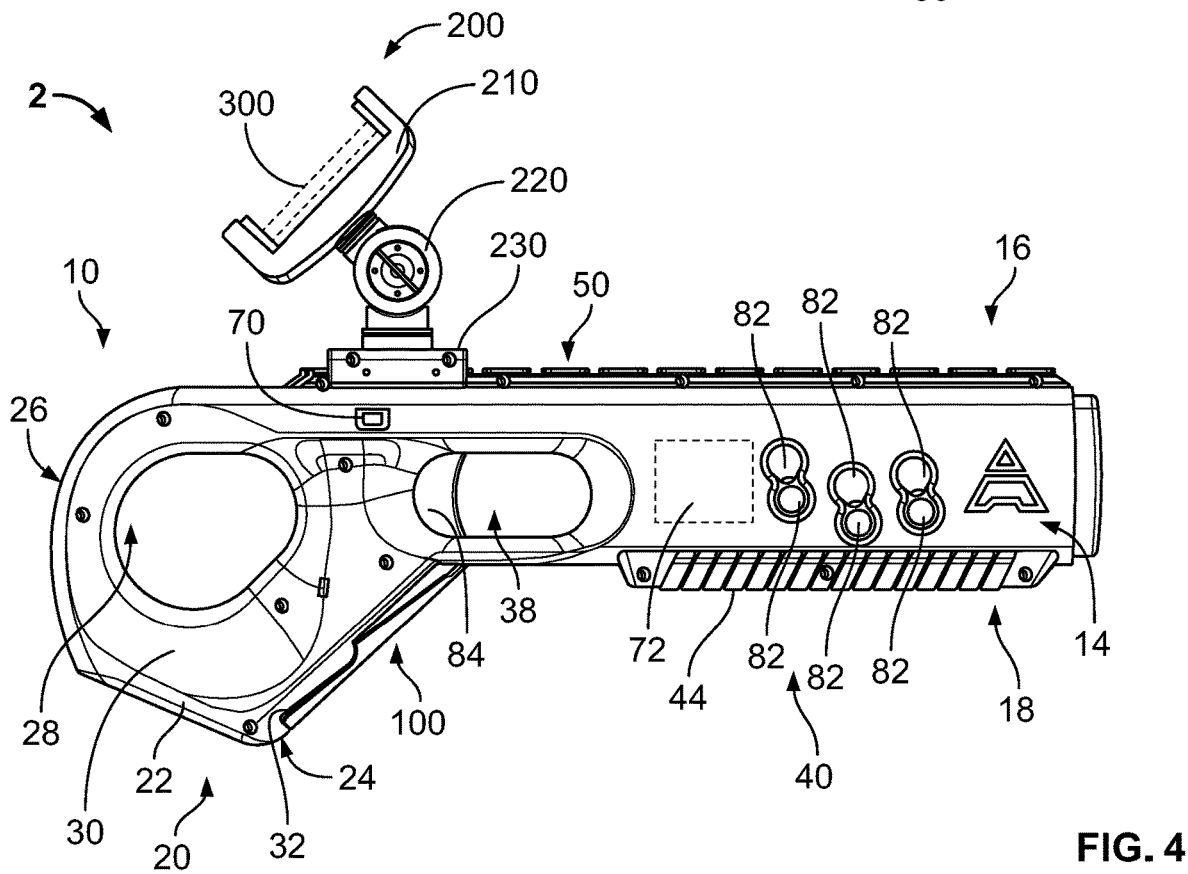
FIG. 4 is a right view of the gaming apparatus of FIG. 1, according to an exemplary embodiment.

As shown in FIGS. 1-4, the rear portion 20 includes a trigger housing, shown as trigger guard 38, positioned (i) between the handgrip 22 and the elongated portion 40 and (ii) above the forward facing surface 24 of the handgrip 22. As shown in FIGS. 3 and 4, the forward facing surface 24 of the handgrip 22 extends downward from a rear end of the trigger guard 38 in a rearward sloping direction. In other embodiments, the forward facing surface 24 extends substantially vertically downward from the rear end of the trigger guard 38.

As shown in FIGS. 1-4, the elongated portion 40 includes a barrel body, shown as barrel 42, that extends from the rear portion 20, forward of the forward facing surface 24 and the trigger guard 38. As shown in FIGS. 2-4, the barrel 42 include a hand support, shown as hand support 44, that extends along at least a portion of the lower side 18 of the barrel 42. In other embodiments, the hand support 44 additionally or alternatively extends downward from the lower side of the barrel 42 (e.g., like a handgrip, a handle, a post, etc.). Such a hand support 44 may be detachable and/or slidably repositionable along the lower side 18 of the barrel 42. According an exemplary embodiment, the hand support 44 assists a user of the gaming controller 10 with supporting the barrel 42 of the gaming controller 10 (e.g., with their non-shooting hand, etc.).

As shown in FIGS. 1-4, the top portion 16 of the gaming controller 10 has an interface, shown as mount interface 50, that extends along the at least a portion of the barrel 42. According to the exemplary embodiment shown in FIGS. 1-4, the mount interface 50 extends along the entire length of the barrel 42 and extends rearward of the trigger guard 38 and at least partially over the handgrip 22. In other embodiments, the mount interface 50 does not extend rearward of the trigger guard 38. In still other embodiments, the mount interface 50 does not extend forward of the trigger guard 38.

As shown in FIGS. 1 and 3, the gaming controller 10 includes an indicator bar, shown as light bar 60. The left side 12 of the barrel 42 defines a plurality of angled slots (e.g., six, eight, ten, twelve, etc. slots), shown as light bar slots 62, and the gaming controller 10 includes one or more light elements, shown as light elements 64, disposed within interior chamber 36 of the barrel 42 and aligned with the light bar slots 62 to form the light bar 60. The light elements 64 may include a plurality of individually controllable lighting elements (e.g., light emitting diodes ("LEDs"), etc.). The light elements 64 may also be operated at various different colors. In some embodiments, the right side 14 of the barrel 42 additionally or alternatively defines the light bar slots 62. In some embodiments, the light bar slots 62 are differently shaped (e.g., circular, ovular, hexagonal, etc.) and/or differently oriented (e.g., vertically oriented, horizontally oriented, etc.). In other embodiments, the light bar 60 is otherwise configured. By way of example, the light bar 60 may be a display screen. According to an exemplary embodiment, the light bar 60 facilitates providing an indication regarding a characteristic within a game associated with the gaming apparatus 2 (e.g., a health status of a character within the game, a number of lives left for a character within the game, a danger/hazard warning, etc.), as described in more detail herein. According to an exemplary embodiment, the light bar 60 is designed such that spectators watching the operator of the gaming apparatus 2 can receive information about a game in progress (e.g., during an eSports event, etc.).

As shown in FIGS. 2 and 4, the gaming controller 10 includes an interface, shown as charging interface 70. As shown in FIG. 2, the charging interface 70 is positioned along the right side 14 of the barrel 42. As shown in FIG. 4, the charging interface 70 is positioned along the rear portion 20, proximate the trigger guard 38. In other embodiments, the charging interface 70 is still otherwise positioned about the gaming controller 10 (e.g., along the left side 12 of the barrel 42, on the bottom of the handgrip 22, along the bottom side 18 of the barrel 42, etc.). As shown in FIGS. 2 and 4, the gaming controller 10 includes energy storage, shown as battery 72, disposed within interior chamber 36 of the barrel 42. In other embodiments, the battery 72 is otherwise positioned (e.g., disposed within the interior chamber 36 of the handgrip 22, etc.). In some embodiments, the battery 72 is rechargeable and/or selectively removable from the gaming controller 10. According to an exemplary embodiment, the battery 72 is configured to store electrical energy received by the charging interface 70 to power various electrical components of the gaming controller 10 when in use (e.g., the light elements 64, a control unit, sensors, etc.). In some embodiments, the charging interface 70 and/or the battery 72 are configured to facilitate powering and/or charging the display device 300 (e.g., wirelessly, via a wired connection, etc.).

As shown in FIGS. 1-4, the gaming controller 10 includes various input/command buttons, shown as power button 80, input buttons 82, trigger 84, and input buttons 86. As shown in FIGS. 1 and 3, the power button 80 is positioned at the end of the barrel 42, along the left side 12 thereof. In other embodiments, the power button 80 is otherwise positioned (e.g., along the right side 14 of the barrel 42, along the rear portion 20, etc.). According to an exemplary embodiment, the power button 80 is configured to facilitate powering up and powering down the gaming controller 10 such that electrical energy is selectively provided to the electrical components thereof by the battery 72. As shown in FIGS. 2-4, the trigger 84 is positioned is positioned within the trigger guard 38. According to an exemplary embodiment, the trigger 84 is configured to facilitate activating a shooting operation by a character within a game associated with the gaming apparatus 2. As shown in FIGS. 1-4, the input buttons 82 are disposed along the left side 12 and the right side 14 of the barrel 42. As shown in FIGS. 1 and 3, the input buttons 86 are positioned along the left side 12 of the handgrip 22, proximate the thumb aperture 28 (e.g., such that they are in a position where they are easily activated by a user's thumb or fingers wrapped around the handgrip 22, etc.). In other embodiments, the input buttons 86 are additionally or alternatively positioned along the right side 14 of the handgrip 22, proximate the thumb aperture 28. According to an exemplary embodiment, the input buttons 82 and/or the input buttons 86 are configured to facilitate performing various different actions within a game associated with the gaming apparatus 2. By way of example, engaging one or more of the input buttons 82 and/or the input buttons 86 may cause a character within the game associated with the gaming apparatus 2 to jump, crouch, dive/slide, throw a knife, throw a grenade, switch weapons, etc. By way of another example, engaging one or more of the input buttons 82 and/or the input buttons 86 may perform various different actions while in menus of the game, such as scroll up, scroll down, and/or make a menu selection (e.g., select a map, select a character, select a weapon or weapons package, select a game type, etc.).

According to an exemplary embodiment, the pedal system 100 is configured facilitate providing commands or signals to the gaming apparatus 2 useable to control at least some operation within a game associated with the gaming apparatus 2 and being displayed by the display device 300. As shown in FIGS. 5-11 and 13, the pedal system 100 includes a lever, shown as pedal 110, (i) having a first end, shown as upper end 112, and an opposing second end, shown as lower end 114, and (ii) defining an interface, shown as pivot aperture 116, positioned between the upper end 112 and the lower end 114 (e.g., proximate the longitudinal center point of the pedal 110, etc.). As shown in FIGS. 11 and 13, the pivot aperture 116 is configured to interface with the pivot 34 of the handgrip 22 to pivotally couple the pedal 110 to the handgrip 22 along the opening of the pedal aperture 32 with (i) the upper end 112 of the pedal 110 proximate the trigger guard 38 and the barrel 42 and (ii) the lower end 114 spaced from the trigger guard 38 and the barrel 42 (e.g., proximate the bottom side 18 of the handgrip 22, etc.).

Figure 5:
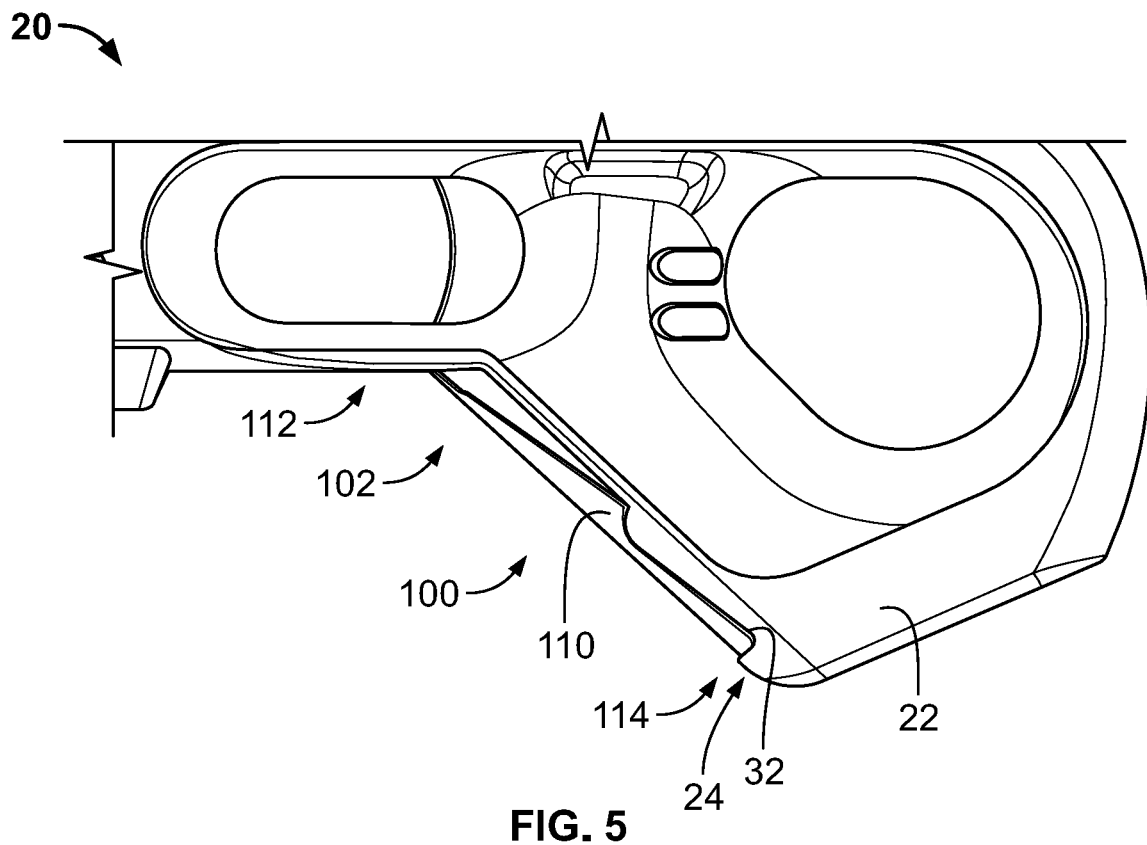
FIG. 5 is a detailed side view of the gaming apparatus of FIG. 1 with the pedal system in a first position, according to another exemplary embodiment.
Figure 6:
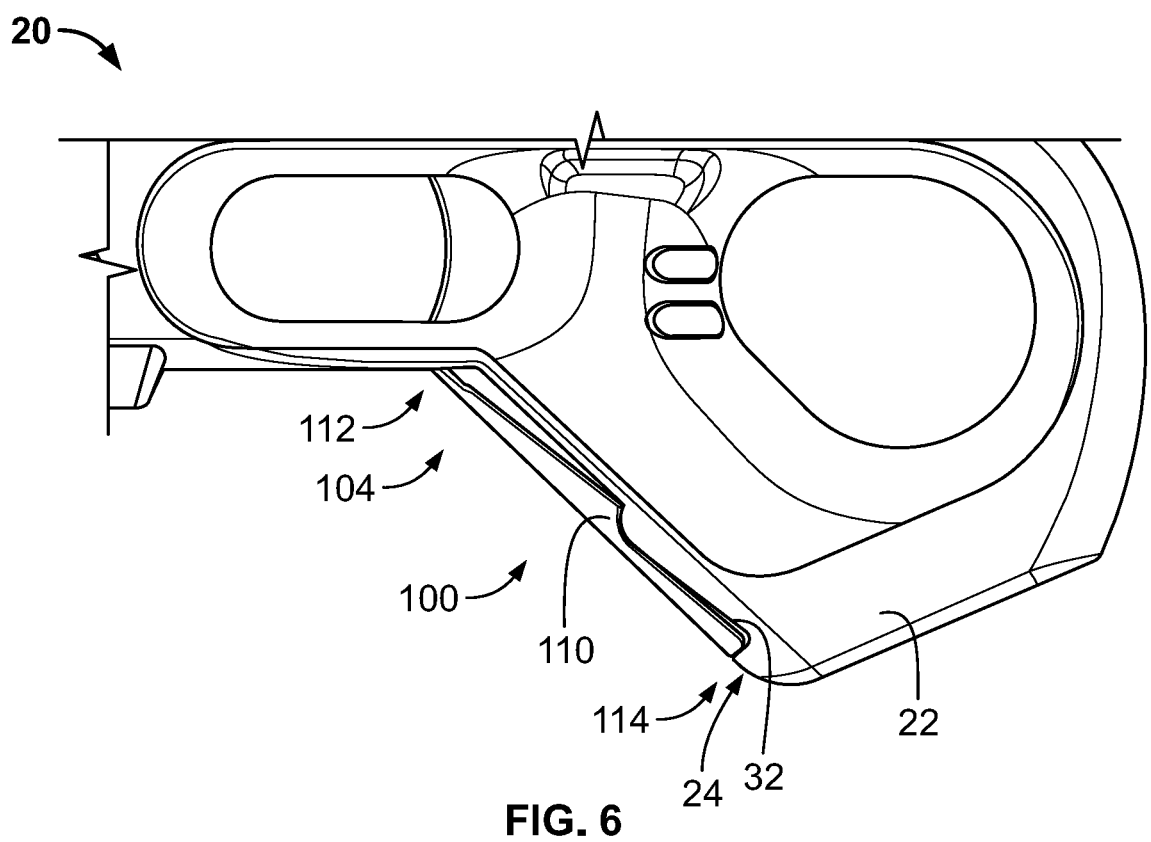
FIG. 6 is a detailed side view of the gaming apparatus of FIG. 1 with the pedal system in a second position, according to an exemplary embodiment.

According to an exemplary embodiment, the pedal 110 is selectively pivotable between a plurality of positions. In some embodiments, the pedal 110 is infinitely adjustable between the plurality of positions. In some embodiments, the pedal 110 is adjustable into predefined positions, and not between the predefined positions. As shown in FIGS. 5-8, the pedal 110 is selectively pivotable between (i) a first position, shown as first position 102, (ii) a second position, shown as nominal position 104, (iii) a third position, shown as second position 106, and a fourth position, shown as third position 108. As shown in FIG. 6, the lower end 114 of the pedal 110 is disposed along (e.g., parallel with, etc.) and flush with the forward facing surface 24 of the handgrip 22 when oriented in the nominal position 104. As shown in FIG. 5, the pedal 110 is pivoted in a first direction about the pivot 34 such that the lower end 114 of the pedal 110 extends into the pedal aperture 32 of the handgrip 22 and the upper end 112 of the pedal 110 extends away from the pedal aperture 32 of the handgrip 22 in response to an operator of the gaming controller 10 pressing on (e.g., squeezing, etc.) the lower end 114 of the pedal 110 to orient the pedal 110 into the first position 102.

Figure 7:
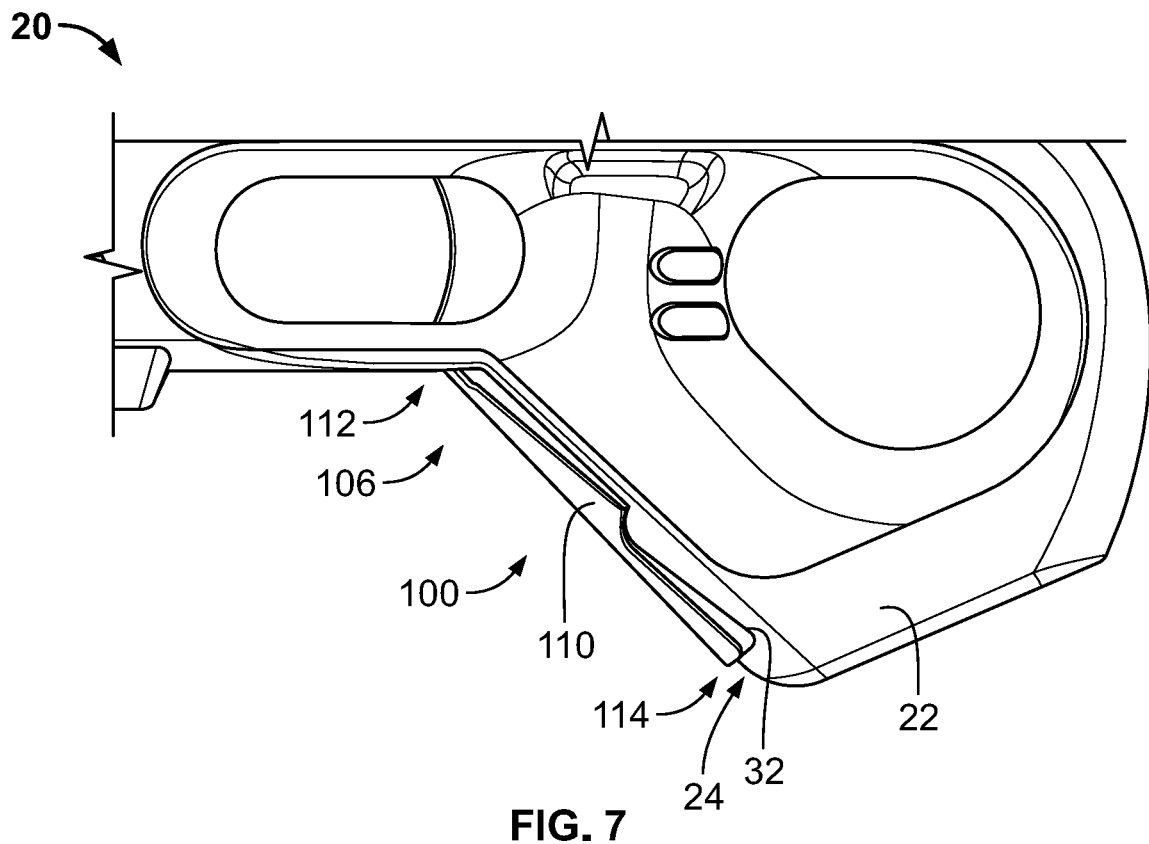
FIG. 7 is a detailed side view of the gaming apparatus of FIG. 1 with the pedal system in a third position, according to an exemplary embodiment.
Figure 8:
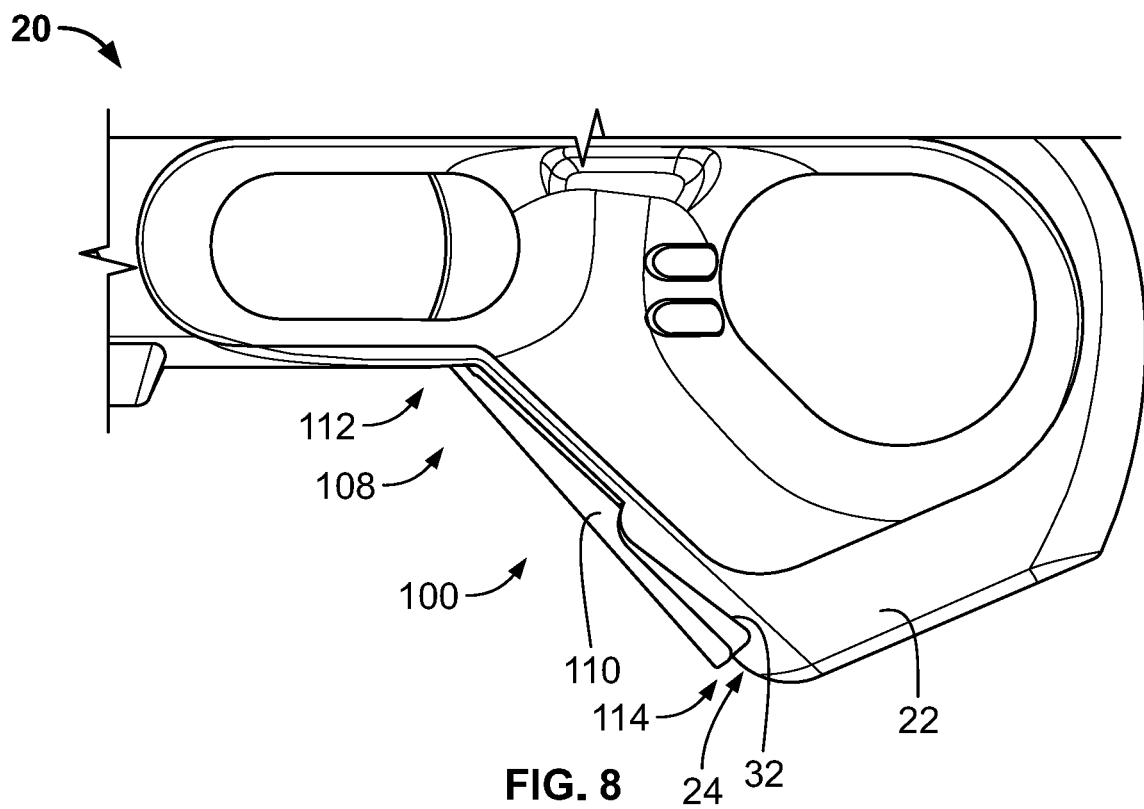
FIG. 8 is a detailed side view of the gaming apparatus of FIG. 1 with the pedal system in a fourth position, according to an exemplary embodiment.
Figure 9:
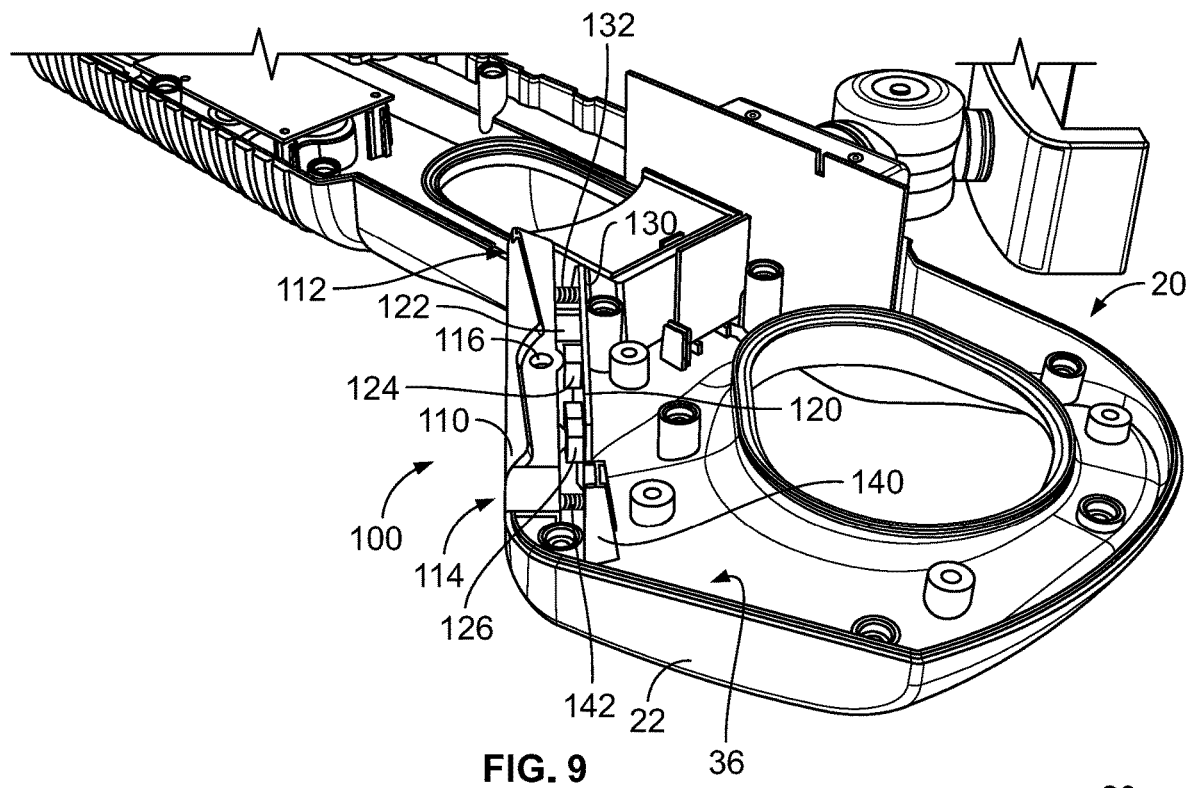
FIG. 9 is a first detailed, perspective, cross-sectional view of the gaming apparatus of FIG. 1, according to an exemplary embodiment.
Figure 10:
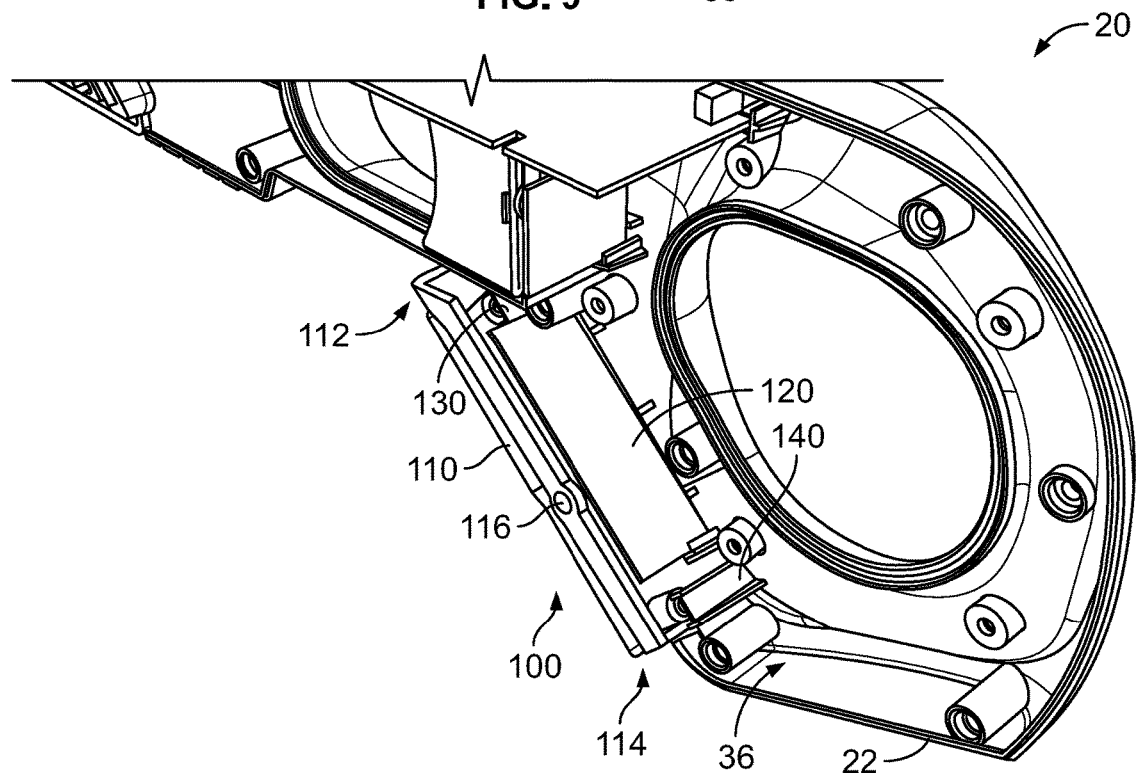
FIG. 10 is a second detailed, perspective, cross-sectional view of the gaming apparatus of FIG. 1, according to an exemplary embodiment.

As shown in FIG. 7, the pedal 110 is pivoted in an opposing second direction about the pivot 34 such that the upper end 112 of the pedal 110 extends towards the pedal aperture 32 of the handgrip 22 and the lower end 114 of the pedal 110 extends away from the pedal aperture 32 of the handgrip 22 in response to an operator of the gaming controller 10 pressing on (e.g., squeezing, etc.) the upper end 112 of the pedal 110 to orient the pedal 110 into the second position 106. As shown in FIG. 8, the pedal 110 is pivoted in the opposing second direction about the pivot 34 such that the upper end 112 of the pedal 110 extends further towards the pedal aperture 32 of the handgrip 22 and the lower end 114 of the pedal 110 extends further away from the pedal aperture 32 of the handgrip 22 in response to an operator of the gaming controller 10 pressing on (e.g., squeezing, etc.) the upper end 112 of the pedal 110 to orient the pedal 110 into the third position 108, beyond the second position 106.

According to an exemplary embodiment, a command or signal provided by the gaming controller 10 is based on a current position of the pedal 110, which is useable to control operation within a game associated with the gaming apparatus 2. By way of example, the gaming controller 10 may provide a first command or signal in response to the pedal 110 being pivoted toward and/or into the first position 102. In some embodiments, the first command or signal is fixed and/or only provided when the first position 102 is reached. In some embodiments, the first command or signal is variable and increases as the pedal 110 approaches the first position 102. The first command or signal may be a command or signal for a character within a game to move backward or in a rearward direction. By way of another example, the gaming controller 10 may provide a second command or signal in response to the pedal 110 being pivoted toward and/or into the second position 106. In some embodiments, the second command or signal is fixed and/or only provided when the second position 106 is reached. In some embodiments, the second command or signal is variable and increases as the pedal 110 approaches the second position 106. The second command or signal may be a command or signal for a character within a game to move forward (e.g., walk, jog, etc.). By way of still another example, the gaming controller 10 may provide a third command or signal in response to the pedal 110 being pivoted toward and/or into the third position 108, after surpassing the second position 106. In some embodiments, the third command or signal is fixed and/or only provided when the third position 108 is reached. In some embodiments, the third command or signal is variable and increases as the pedal 110 approaches the second position 106. The third command or signal may be a command or signal for a character within a game to move forward at a faster pace than when the second command or signal is provided (e.g., run, sprint, etc.).

In an alternative embodiment, the pedal 110 is not pivotally coupled to the handgrip 22, but rather the pedal 110 includes a first plate (e.g., a first button, a top plate, etc.) and a second plate (e.g., a second button, a bottom button, etc.) that are separate and distinct. The first plate and the second plate may be selectively depressible to provide the first command or signal, the second command or signal, and/or the third command or signal.

According to an exemplary embodiment, the pedal system 100 includes one or more position detectors configured to detect the current position of the pedal 110. As shown in FIGS. 9-13, the pedal system 100 includes a first support (e.g., a support plate, etc.), shown as position detector support 120, disposed within the interior chamber 36 of the handgrip 22 and spaced from the pedal 110. According to an exemplary embodiment, the position detector support 120 is parallel with the pedal 110 when the pedal 110 is oriented in the nominal position 104. As shown in FIGS. 9 and 11-13, the pedal system 100 includes a first position detector, shown as position detector 122, positioned on a first side of the pivot 34, proximate the upper end 112 of the pedal 110. According to an exemplary embodiment, the position detector 122 is configured to detect when the pedal 110 is selectively pivoted toward and/or into the second position 106 (e.g., in response to the upper end 112 of the pedal 110 engaging the position detector 122, etc.). As shown in FIGS. 9 and 11-13, the pedal system 100 includes a second position detector, shown as position detector 124, positioned on the first side of the pivot 34, between the position detector 122 and the pivot 34. According to an exemplary embodiment, the position detector 124 is configured to detect when the pedal 110 is selectively pivoted toward and/or into the third position 108, beyond the second position 106 (e.g., in response to the upper end 112 of the pedal 110 engaging the position detector 124, etc.). In some embodiments, the pedal system 100 does not include the position detector 124. As shown in FIGS. 9 and 11-13, the pedal system 100 includes a third position detector, shown as position detector 126, positioned on an opposing second side of the pivot 34, proximate the lower end 114 of the pedal 110. According to an exemplary embodiment, the position detector 126 is configured to detect when the pedal 110 is selectively pivoted toward and/or into the first position 102 (e.g., in response to the lower end 114 of the pedal 110 engaging the position detector 126, etc.). According to an exemplary embodiment, the position detector 122, the position detector 124, and the position detector 126 are analog potentiometers. In other embodiments, other suitable position detectors are used (e.g., optical detectors/sensors, switches, etc.). In still other embodiments, the position detector 122, the position detector 124, and the position detector 126 are replaced with a single position detector that is configured to detect the current position of the pedal 110.

According to an exemplary embodiment, the pedal system 100 includes one or more resilient elements (e.g., springs, etc.) positioned to bias the pedal 110 into the nominal position 104. As shown in FIGS. 9-13, the pedal system 100 includes a second support, shown as first spring support 130, disposed within the interior chamber 36 of the handgrip 22 and positioned proximate the upper end 112 of the pedal 110; a third support, shown as second spring support 140, disposed within the interior chamber 36 of the handgrip 22 and positioned proximate the lower end 114 of the pedal 110; a first resilient element, shown as first spring 132, positioned between the first spring support 130 and the upper end 112 of the pedal 110; and a second resilient element, shown as second spring 142, positioned between the second spring support 140 and the lower end 114 of the pedal 110. According to an exemplary embodiment, the first spring 132 and the second spring 142 are linear springs positioned to cooperatively bias the pedal 110 into the nominal position 104 when the pedal 110 is selectively oriented into the first position 102, the second position 106, or the third position 108. In some embodiments, the pedal system 100 only includes one of the first spring 132 or the second spring 142. In other embodiments, the pedal system 100 does not include the first spring 132 or the second spring 142 but, rather, the pedal system 100 includes a torsion spring or other suitable resilient element positioned to bias the pedal 110 into the nominal position 104 when the pedal 110 is selectively oriented into the first position 102, the second position 106, or the third position 108. In still other embodiments, the pedal system 100 does not include resilient elements.

As shown in FIGS. 1-4, the mount 200 includes a coupler, shown as display coupler 210; an adjuster, shown as pivotal adjuster 220, coupled to the display coupler 210; and a base, shown as mount base 230, coupled to the display coupler 210 by the pivotal adjuster 220. According to an exemplary embodiment, the display coupler 210 is configured to selectively and releasably secure the display device 300 to the mount 200. In other embodiments, the display device 300 is fixed to the mount 200. According to an exemplary embodiment, the mount base 230 is configured to secure the mount 200 to the mount interface 50. In some embodiments, the mount base 230 is releasably coupled to the mount interface 50 (e.g., detachable, etc.). In some embodiments, the mount base 230 is fixed to the mount interface 50. In some embodiments, the mount base 230 is selectively repositionable along the mount interface 50 (e.g., translatable, slidable, etc.). In some embodiments, the mount base 230 is in a fixed location (e.g., not translatable, not slidable, couples to the mount interface 50 in a designated position, etc.). As shown in FIGS. 1-4, the pivotal adjuster 220 is configured to facilitate selectively adjusting an angle of the display coupler 210 relative to the mount base 230 (i.e., to adjust a display angle of the display device 300).

In some embodiments, the display device 300 is a portable user/gaming device capable of independently operating a game. By way of example, the portable user/gaming device may be smartphone, a tablet, a dedicated portable user/gaming device (i.e., a portable video game console), and/or another portable user device that can operate a game. Such a portable user/gaming device may be selectively detachable from the mount 200 and operated without the gaming controller 10. In some embodiments, the display device 300 is a dedicated display that is incapable of independently operating a game. By way of example, the dedicated display may be a monitor, a television, a display screen, and/or a similar display device. Such a dedicated display may be fixed to the mount 200, selectively detachable from the mount 200, and/or fixed to the gaming controller 10. In some embodiments, the display device 300 is not mechanically coupled to the gaming controller 10. By way of example, the display device 300 may be a virtual reality ("VR") headset or an augmented reality ("AR") headset wearable by an operator of the gaming apparatus 2.

Figure 14:
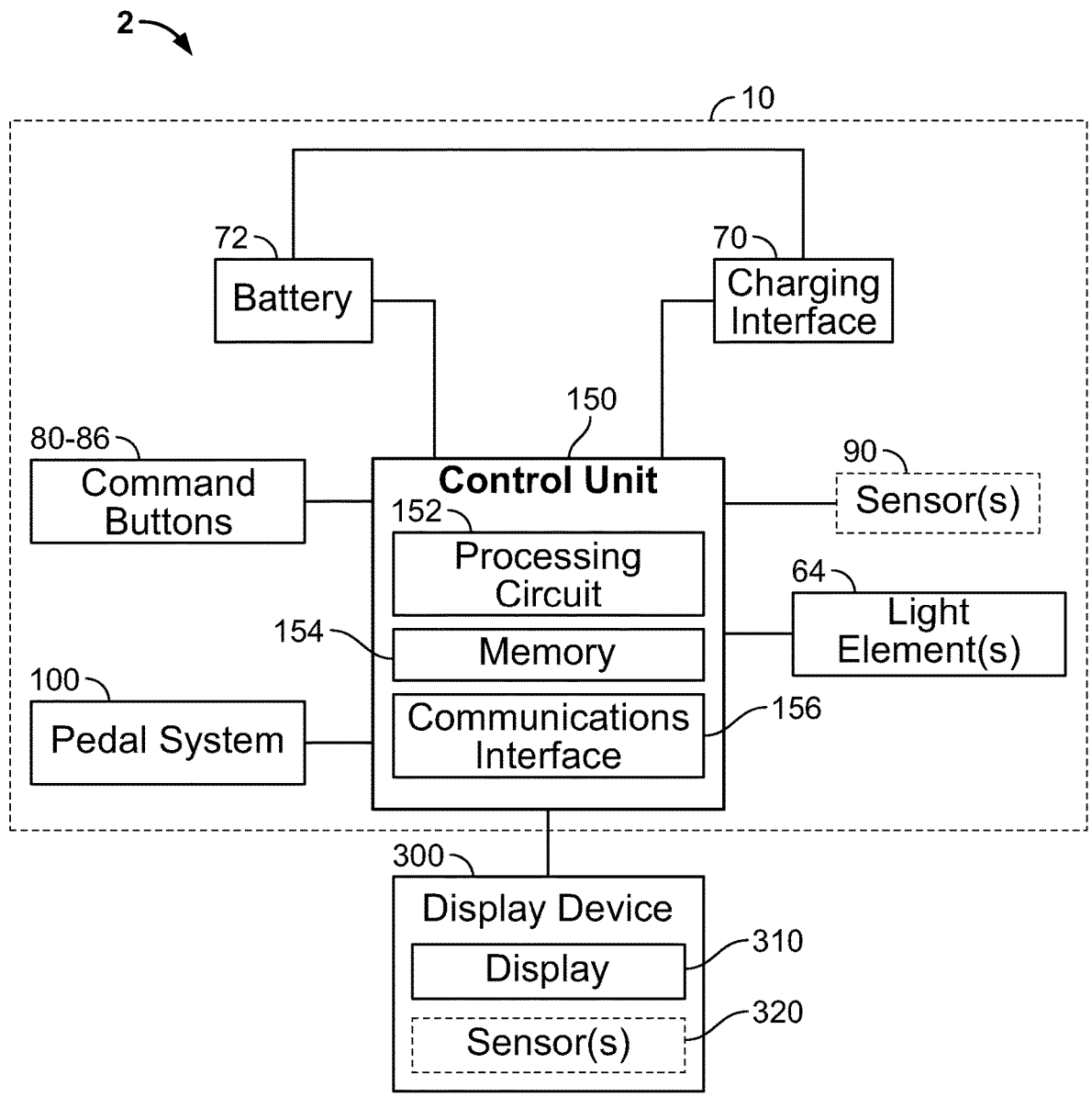
FIG. 14 is a schematic block diagram of the gaming apparatus of FIG. 1, according to an exemplary embodiment.

As shown in FIG. 14, the gaming apparatus 2 includes a control system, shown as control unit 150. While the control unit 150 is shown as being a part of the gaming controller 10, the control unit 150 may additionally or alternatively be a part of the display device 300. Accordingly, the functions described herein in relation to the control unit 150 may be performed by the gaming controller 10, by the display device 300, or both. As shown in FIG. 14, the control unit 150 includes a processing circuit 152, memory 154, and a communication device (e.g., a receiver, a transmitter, a transceiver, etc.), shown as communications interface 156.

The control unit 150 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. The processing circuit 152 may include an ASIC, one or more FPGAs, a DSP, circuits containing one or more processing components, circuitry for supporting a microprocessor, a group of processing components, or other suitable electronic processing components. In some embodiments, the processing circuit 152 is configured to execute computer code stored in the memory 154 to facilitate the activities described herein. The memory 154 may be any volatile or non-volatile computer-readable storage medium capable of storing data or computer code relating to the activities described herein. According to an exemplary embodiment, the memory 154 includes computer code modules (e.g., executable code, object code, source code, script code, machine code, etc.) configured for execution by the processing circuit 152.

According to an exemplary embodiment, the control unit 150 is configured to selectively engage, selectively disengage, control, and/or otherwise communicate with the other components of the gaming apparatus 2. As shown in FIG. 14, the communications interface 156 is configured to couple the control unit 150 to (i) the gaming controller 10 and/or components thereof and (ii) the display device 300 and/or components thereof. In other embodiments, the control unit 150 is coupled to more or fewer components. By way of example, the control unit 150 may send signals to and receive signals from the components of the gaming controller 10 such as the light elements 64, the charging interface 70, the battery 72, the input/command buttons (e.g., the power button 80, the input buttons 82, the trigger 84, the input buttons 86, etc.), one or more sensors, shown as sensors 90, and/or the pedal system 100 (e.g., the position detector 122, the position detector 124, the position detector 126, etc.) via the communications interface 156. By way of another example, the control unit 150 may send signals to and receive signals from the components of the display device 300 such as a display (e.g., a display screen, etc.), shown as display 310, and/or one or more sensors, shown as sensors 320 via the communications interface 156. By way of another example, the communications interface 156 may communicably couple the gaming controller 10 to the display device 300 such that (i) the gaming controller 10 can provide inputs and/or commands to the display device 300 and/or (ii) the display device 300 can provide an indication regarding a characteristic within a game operating on display device 300 to the gaming controller 10. The communications interface 156 may utilize various wired communication protocols and/or short-range wireless communication protocols (e.g., Bluetooth, near field communication ("NFC"), RFID, ZigBee, Wi-Fi, etc.) to facilitate communication with the various components of the gaming controller 10 and/or the display device 300.

According to an exemplary embodiment, the control unit 150 is configured to receive inputs from the power button 80, the input buttons 82, the trigger 84, the input buttons 86, and/or the pedal system 100 and either (i) transmit the inputs to the display device 300 for the display device 300 to interpret and implement (e.g., when the display device 300 is capable of independently operating a game, etc.), (ii) provide a command to the display device 300 to implement within the game based on the inputs, or (iii) implement a command within the game based on the inputs and have the display 310 provide the result of the input (e.g., when the display device 300 is not capable of independently operating a game, etc.). The inputs from the input buttons 82, the trigger 84, the input buttons 86, and/or the pedal system 100 may be an indication that the operator of the gaming apparatus 2 desires that their character in the game jumps, crouches, dives/slides, throws a knife, throws a grenade, switches weapons, shoots a weapon, moves backward, moves forward, walks, jogs, runs, sprints, etc. The inputs from the input buttons 82, the trigger 84, the input buttons 86, and/or the pedal system 100 may additionally or alternatively be an indication that the operator of the gaming apparatus 2 desires various different actions while in menus of the game such as scroll up, scroll down, and/or make a menu selection (e.g., select a map, select a character, select a weapon or weapons package, select a game type, etc.). The inputs from the power button 80 may be an indication that the operator of the gaming apparatus 2 desires that the gaming controller 10 be turned on or off.

According to an exemplary embodiment, the control unit 150 is configured to receive an indication regarding a characteristic within a game operated by the gaming apparatus 2 (e.g., the display device 300, the gaming controller 10, etc.) and control the light elements 64 of the light bar 60 to provide a visual indication of the characteristic within the game operated by the gaming apparatus 2. By way of example, the control unit 150 may be configured to receive an indication regarding a health status of a character within the game that is associated with the operator of the gaming controller 10 and control the light elements 64 (e.g., selectively illuminate one or more of the light elements 64, etc.) to provide a visual indication of the character's health via the light bar 60. By way of another example, the control unit 150 may be configured to receive an indication regarding a number of lives remaining for a character within the game that is associated with the operator of the gaming controller 10 and control the light elements 64 (e.g., selectively illuminate one or more of the light elements 64, etc.) to provide a visual indication of the number of remaining lives via the light bar 60. By way of still another example, the control unit 150 may be configured to receive an indication regarding a hazard or event within the game (e.g., radiation, warning, danger, boss level, level up, etc.) and control the light elements 64 to change to a designated color (e.g., green, red, blue, etc.) or to flash to provide a visual indication of the type of hazard or event within the game via the light bar 60.

According to an exemplary embodiment, the control unit 150 is configured to receive inputs from the sensors 90 of the gaming controller 10 and/or the sensors 320 of the display device 300. In some embodiments, the gaming controller 10 does not includes the sensors 90. In some embodiments, the display device 300 does not includes the sensors 320. The sensors 90 and/or the sensors 320 may include an accelerometer, a gyroscope, and/or other suitable motion sensors configured to detect the spatial orientation and/or movement of the gaming controller 10. Based on signals received from the sensors 90 and/or sensors 320, the control unit 150 may be configured to adjust the display provided by the display 310 of the display device 300. By way of an example, the sensors 90 and/or the sensors 320 may detect when the gaming controller 10 is pointed up, pointed down, turned to the left, turned to the right, etc. and the control unit 150 may be configured to adaptively adjust the display on the display 310 based on such movement of the gaming controller 10 to correspond with the movement of the gaming controller 10.

Figure 15:
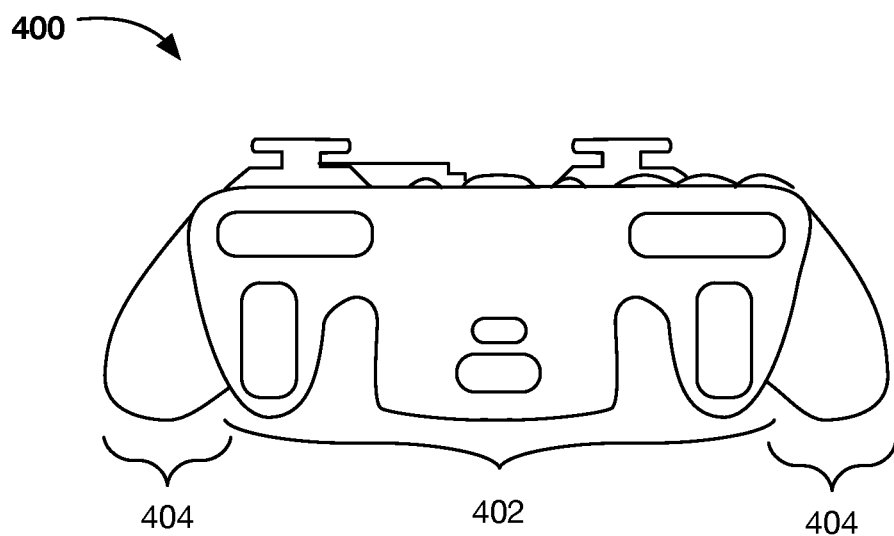
FIG. 15 is a rear view of a handheld gaming apparatus, according to an exemplary embodiment.
Figure 16:
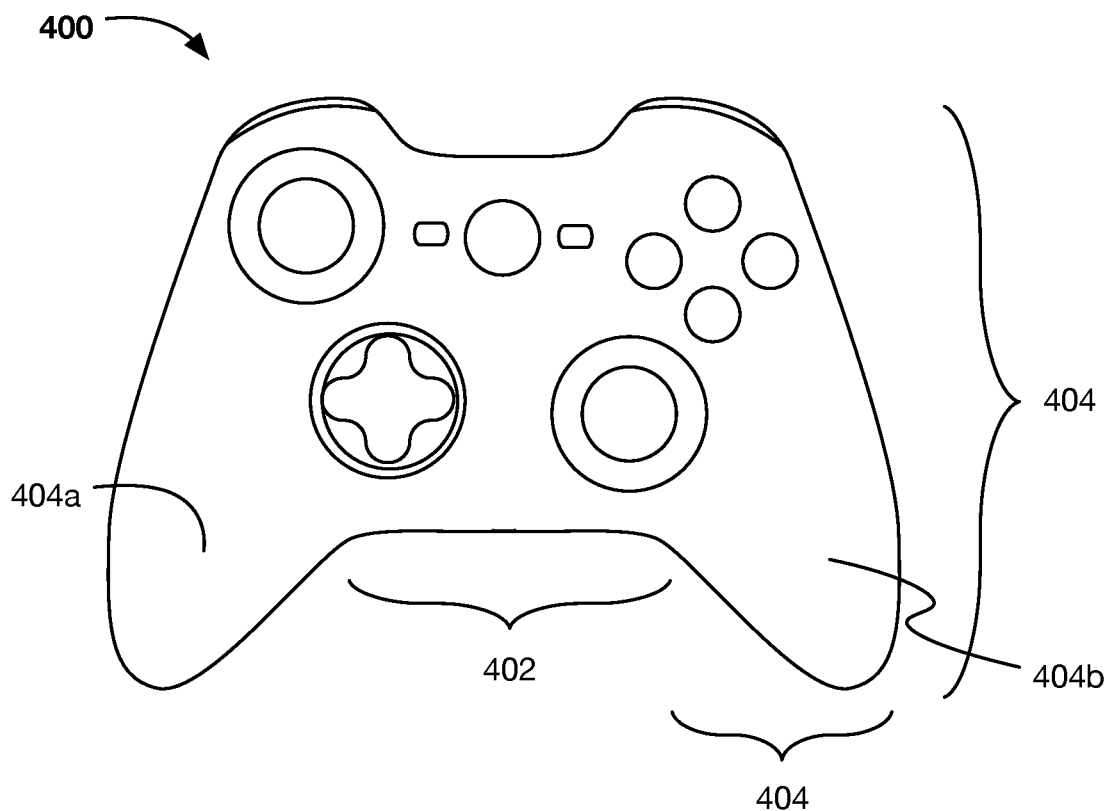
FIG. 16 is a top view of the handheld gaming apparatus of FIG. 15, according to an exemplary embodiment.

Although primarily discussed above in terms of a gaming controller having a rifle, pistol, or "blaster" design, many of the systems discussed above may be integrated into other form factors of controllers. For example, FIGS. 15 and 16 are a rear view and top view, respectively, of a handheld gaming apparatus 400, according to an exemplary embodiment, having a "batwing" form factor, approximately resembling a trapezoid. The side portions 404 (comprising left "wing" 404*a* and a right "wing" 404*b*, and referred to variously as side portions, wings, or handgrips) are adapted to be held by a user's hands (and particularly between the user's palms and fourth or fifth fingers), freeing the user's thumbs to access controls on the top of the body 402 of the controller (e.g. buttons, joysticks, etc.) and the user's index fingers (and sometimes middle fingers) to access controls on the rear of the controller (e.g. digital or analog switches, sometimes referred to as "bumpers" or "triggers"). Many implementations of controllers utilize this general form factor, with differences primarily in specific dimensions (e.g. angles of the "wings" 404 relative to the body 402) and placement of buttons or joysticks on the top of the controller. In a similar implementation, a controller may have a substantially square or rectangular form factor (e.g. with sides 404 that are parallel). Side regions 404 of such controllers may frequently include enlarged portions to be gripped in a similar manner to wings 404 (e.g. by a user's palm and fourth or fifth fingers).

Figure 17:
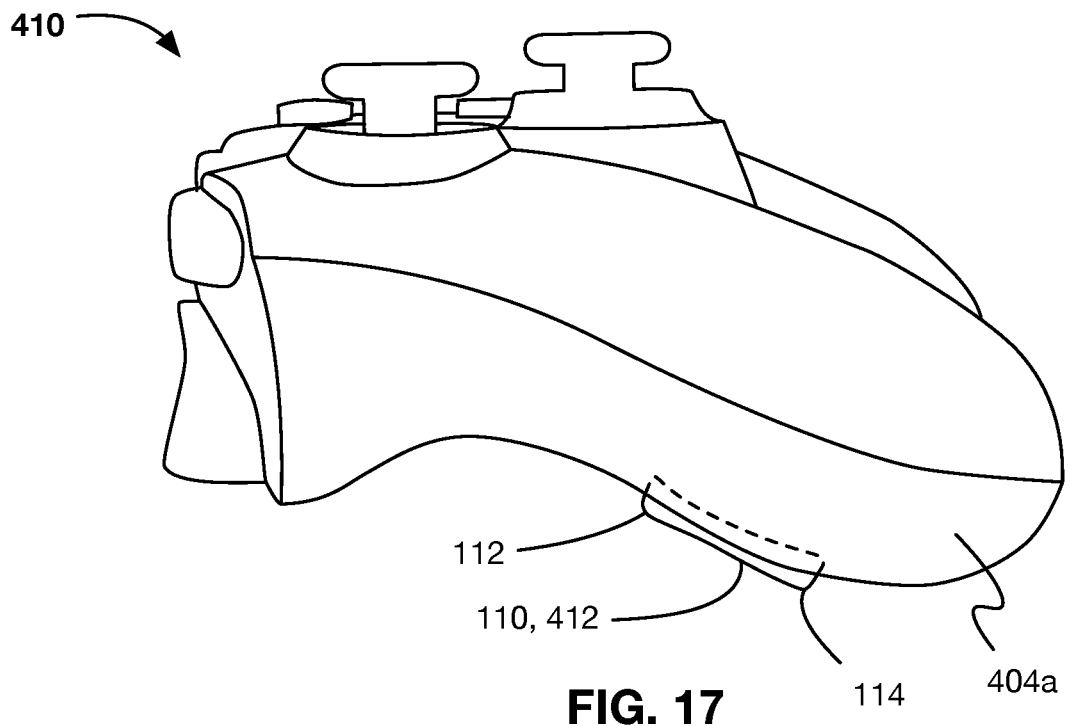
FIG. 17 is a side view of another handheld gaming apparatus, according to an exemplary embodiment.
Figure 18:
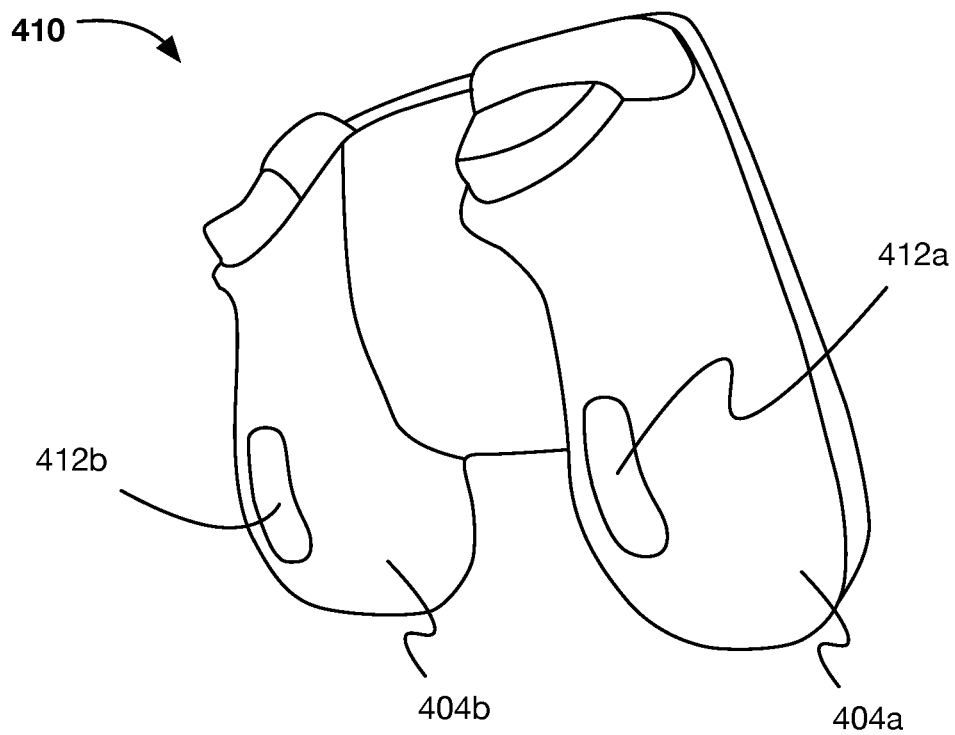
FIG. 18 is a rear perspective view of the handheld gaming apparatus of FIG. 17, according to an exemplary embodiment.

As discussed above, a gaming apparatus or controller may include one or more pedal systems 100, such as a lever 110 with an upper end 112 and lower end 114 (or discrete buttons or plates, in some implementations, as discussed above), and a corresponding one or more position detectors configured to detect the current position of the pedal and/or buttons or plates. In some implementations as discussed herein, a handheld gaming apparatus may also include one or more pedal systems 100, allowing a user's fingers (e.g. middle through fifth fingers) and/or palm to apply pressure to control inputs of the gaming system in a manner not available to handheld controllers not implementing such pedal systems. For example, FIGS. 17 and 18 are a side view and rear perspective view, respectively, of another handheld gaming apparatus 410 incorporating a pedal system according to an exemplary embodiment. As shown, a pedal system such as a lever 110, 412 may be positioned on (or partially within) a rear surface of a "wing" or side portion 404 of a handheld controller 410. For example, a first lever 412*a* is shown on a rear portion of a left wing 404*a*, and a second lever 412*b* is shown on a rear portion of right wing 404*b* of the handheld controller 410. Internal components to the pedal system may be substantially identical to those discussed above in connection with pedal system 100, including one or more springs, position sensors, pins or fulcrums, etc. Although shown slightly protruding, in some implementations, a lever 412 may be substantially flush with a surface of the wing 404 or handheld controller 410. Furthermore, although shown in a position to be engaged by a user's fourth and fifth fingers (e.g. on a top portion 112 and lower portion 114), in some implementations, the levers 412 may be larger and extend over a greater portion of the wings 404 (allowing engagement by the user's middle fingers on a top portion 112). Pressing or squeezing on the top or bottom of each lever may trigger position sensors or similar switches to provide any suitable input to a game or application, such as movement forwards or backwards, movement to the left or right, movement up or down, user interface commands (e.g. up or down or forward or back within a menu system), selection, reloading, zooming in and out, or any other such command. In some implementations, the entire lever may be configured to be depressed (e.g. squeezing both the top and bottom portions 112, 114 simultaneously) to trigger a third command. The lever and corresponding position sensor or sensors may be digital or analog, in various implementations, including digital or analog switches, potentiometers (e.g. to allow smooth reading of positions of the lever from one end of travel to the other), magnetic or Hall effect sensors, capacitive sensors, optical sensors, or any other type and form of sensors. For example, in one implementation, a magnet may be placed at one (or both) ends of a lever, and Hall effect sensor (or sensors) positioned within the body of the wing such that movement of the lever moves the magnet closer or farther from the sensor, varying an analog signal. In another implementation, an internal side of the lever may be colored with a gradient, e.g. from white to black, and an optical emitter and corresponding sensor may be used measure reflectivity of the emitted light from the lever. Such implementations may be resistant to dust or other debris.

Figure 19:
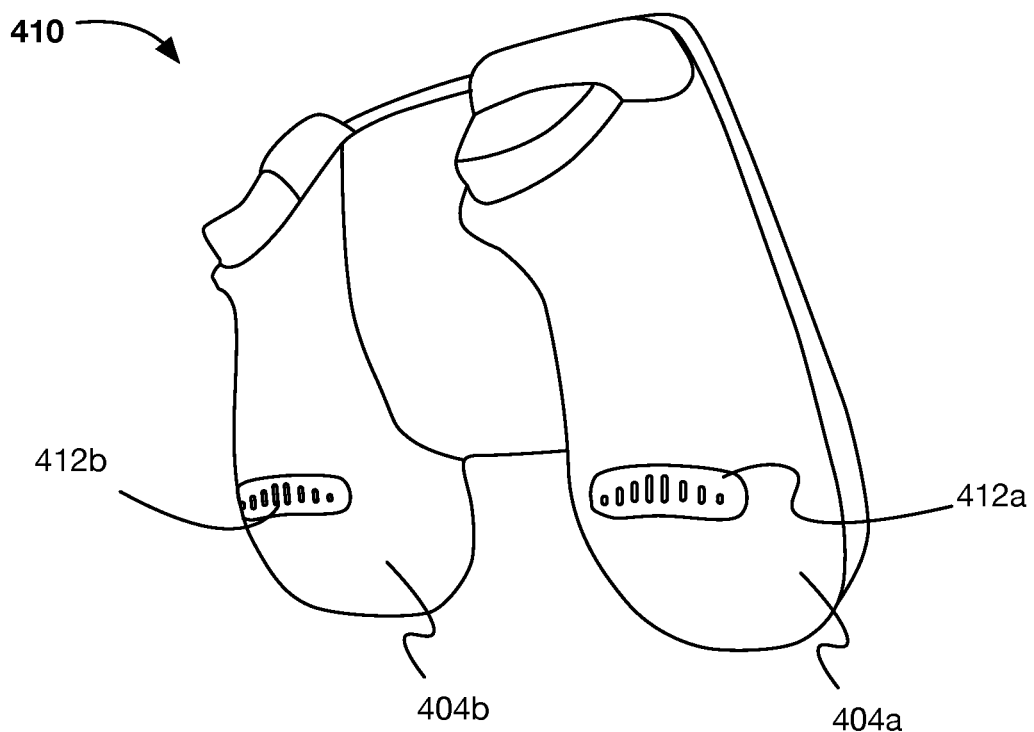
FIG. 19 is a rear perspective view of another handheld gaming apparatus, according to an exemplary embodiment.
Figure 20:
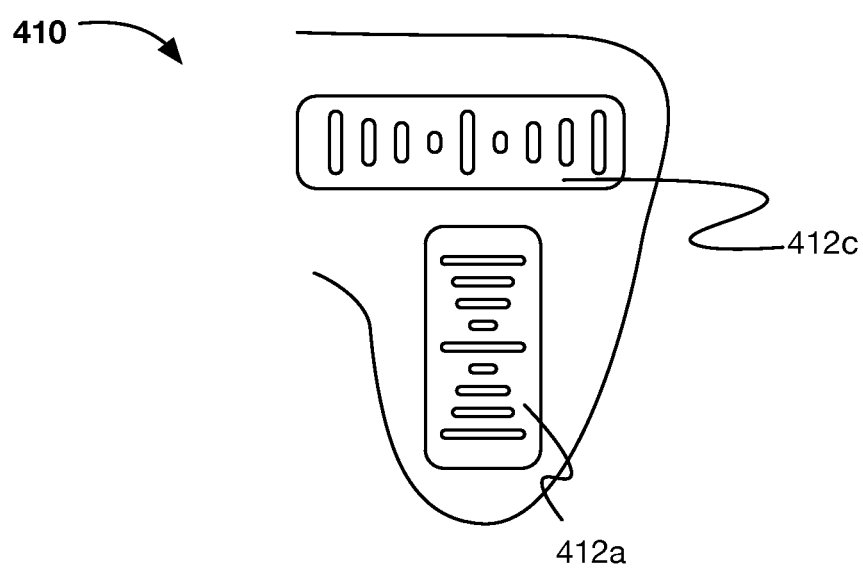
FIG. 20 is a rear view of a portion of another handheld gaming apparatus, according to an exemplary embodiment.

In the implementation illustrated in FIGS. 17-18, pedal systems 412 are configured with a greater dimension vertically or longitudinally along the wing or side portion of the controller. FIG. 19 is a rear perspective view of another implementation of a handheld gaming apparatus, with pedal systems 412a-412b configured horizontally or laterally across the wing or side portions of the controller 410. Such pedal systems may be useful for triggering lateral motion commands or controls within games or other applications, as well as for other commands for which a vertical control is less intuitive. In some implementations, a mix of vertical and horizontal (or longitudinal and lateral) pedal systems may be included on a controller. For example, FIG. 20 is a rear view of a portion of another handheld gaming apparatus, according to an exemplary embodiment, including a lateral pedal 412c in addition to a vertical pedal 412a. In the implementation shown, a button, typically referred to as a bumper, has been replaced with a lateral pedal 412c. In such implementations, a user's index finger may be used to actuate the control (e.g. rocking the pedal laterally, or pressing on the pedal to actuate a third command in some implementations).

Additionally, in the implementations illustrated in FIGS. 19-20, the pedals include ridges to provide tactile feedback. Although shown with ridges, any other type and form of texture or alteration of the pedal from a flat or linear shape may be utilized. For example, in some implementations, the pedal may be curved (either concave or convex) to allow a user to distinguish the pedal from the surrounding surface of the controller, and/or to distinguish opposite ends of the pedal from the middle of the pedal or each other. For example, a pedal may have a first type of ridges on one portion and a second type of ridges on a second portion that may be distinctive to a user's touch. In another example, a pedal may be curved to follow a curved rear surface of a wing of a controller (e.g. as shown in FIG. 19), such that the surface of the pedal is substantially parallel to the rear surface of the controller. Resilient elements and/or sensors within the body of the controller may be adjusted in depth to follow a similar line, providing constant feedback across the pedal or lever.

Furthermore, in some implementations, haptic feedback may be incorporated into the pedal system or provided by a haptic element. For example, a switch engaged by a lever may have a resilient portion or detent such that the lever "clicks" when engaged beyond a certain depth, providing physical feedback to the user. In other implementations, a haptic feedback element (e.g. linear or rotational actuator and weight, or a similar device) may be triggered for a predetermined time or with a predetermined strength responsive to a position sensor being activated, such that the controller "buzzes" or vibrates slightly in response to a user engaging the pedal system.

Figure 21:
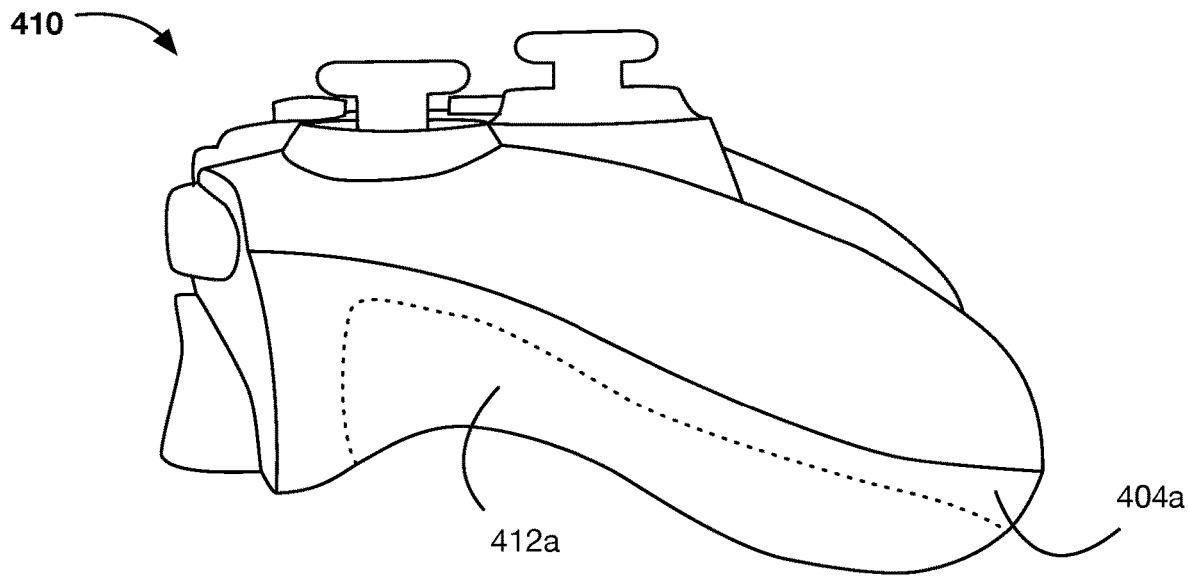
FIG. 21 is a side view of another handheld gaming apparatus, according to an exemplary embodiment.
Figure 22:
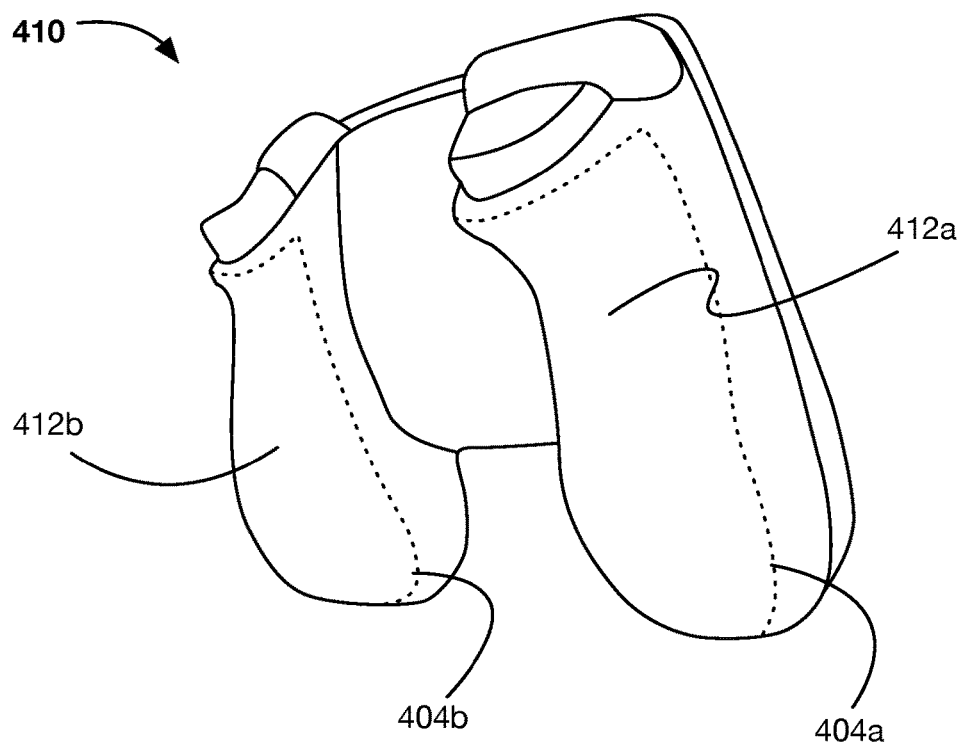
FIG. 22 is a rear perspective view of the handheld gaming apparatus of FIG. 21, according to an exemplary embodiment.

Although primarily discussed in terms of physical levers 110 (or buttons or plates), pedal systems 100 may be used without a physical lever 110 in some implementations. For example, FIGS. 21 and 22 are a side view and rear perspective view, respectively, of another handheld gaming apparatus 410 incorporating non-moving pedal systems 412a-412b (shown in dotted line), according to an exemplary embodiment. Pedal systems 412a-412b may be deployed within each wing 404a-404b as shown, and may comprise non-moving (or substantially non-moving) sensors, such as capacitive sensors or resistive sensors. For example, in one implementation, a portion of the rear surface of each wing 404 may comprise a resistive touch sensor comprising two conductive layers separated by a non-conductive layer (which may be continuous or discontinuous, in various implementations), such that a user may press on the top or bottom portion of the rear surface 412a-412b, pressing the conductive layers together under the user's finger, and allowing measurement of a voltage drop between the conductive layers. In a similar implementation, a portion of the rear surface of each wing 404 may comprise a capacitive touch sensor, comprising two conductive layers separated by a dielectric material, with capacitance varied responsive to a user's finger touching a portion of the sensor. In some implementations, each pedal system 412 may comprise a single continuous sensor across the rear surface of the wing 404. A longitudinal (and/or lateral) position of the user's finger or fingers on the sensor may be detected, allowing continuous control of a variable or command (e.g. equivalent to an analog lever). In other implementations, a first sensor may be positioned at a first position on the rear surface of the wing 404 and a second sensor may be positioned at a second position on the rear surface of the wing 404 (e.g. respectively positioned to be beneath a user's middle finger and fifth finger, or fourth finger and fifth finger, in various implementations). In such implementations, a longitudinal position of the user's finger along the sensor may not need to be detected; rather, detection of the user's finger on the first sensor may correspond to a press on a top of a lever, and detection of the user's finger on the second sensor may correspond to a press on the bottom of a lever. In a further implementation, detection of a user's finger on each sensor may correspond to a squeeze of the lever (e.g. as a third control or command, as discussed above). Although discussed above in terms of resistive and capacitive sensors, other implementations of sensors may be used, such as piezoelectric sensors, strain gauge sensors, deflection sensors, transmissive or reflective optical sensors (e.g. detecting a change in light at a sensor under a hole or transparent portion of the wing 404 corresponding to a first position and second position, or detecting occlusion of a light within the body of the controller by a lever), etc. Accordingly, although referred to as a "pedal" system, the term may refer to a logical system rather than a physical pedal or lever, and may comprise any sensor or combination of sensors as discussed above, including digital and/or analog encoders.

Figure 23:
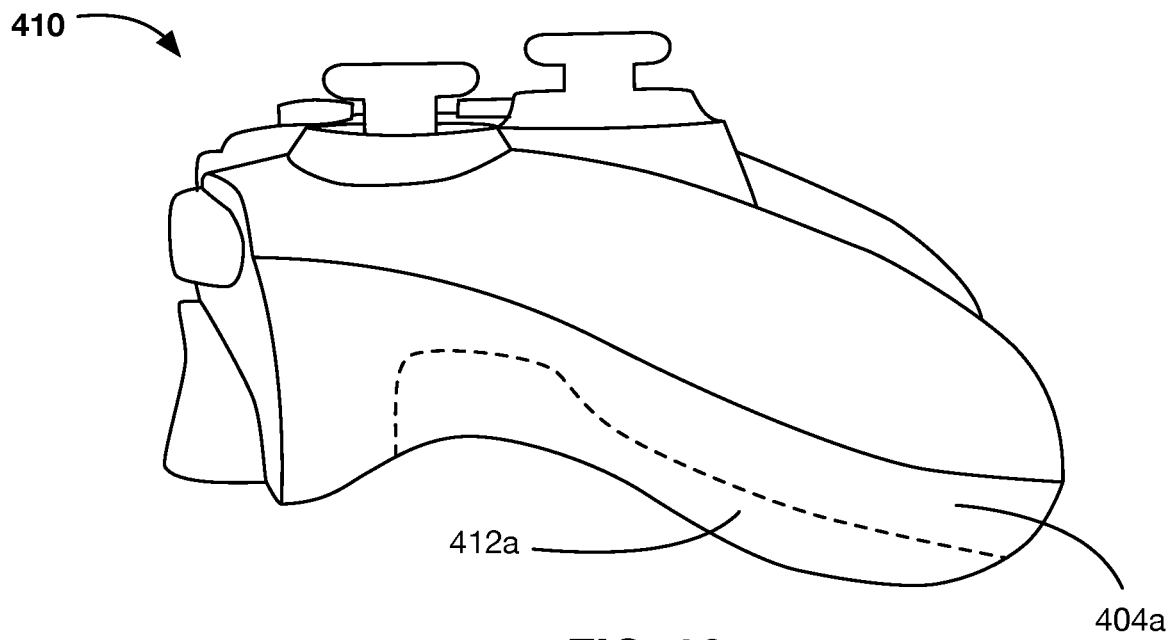
FIG. 23 is a side view of another handheld gaming apparatus, according to an exemplary embodiment.
Figure 24:
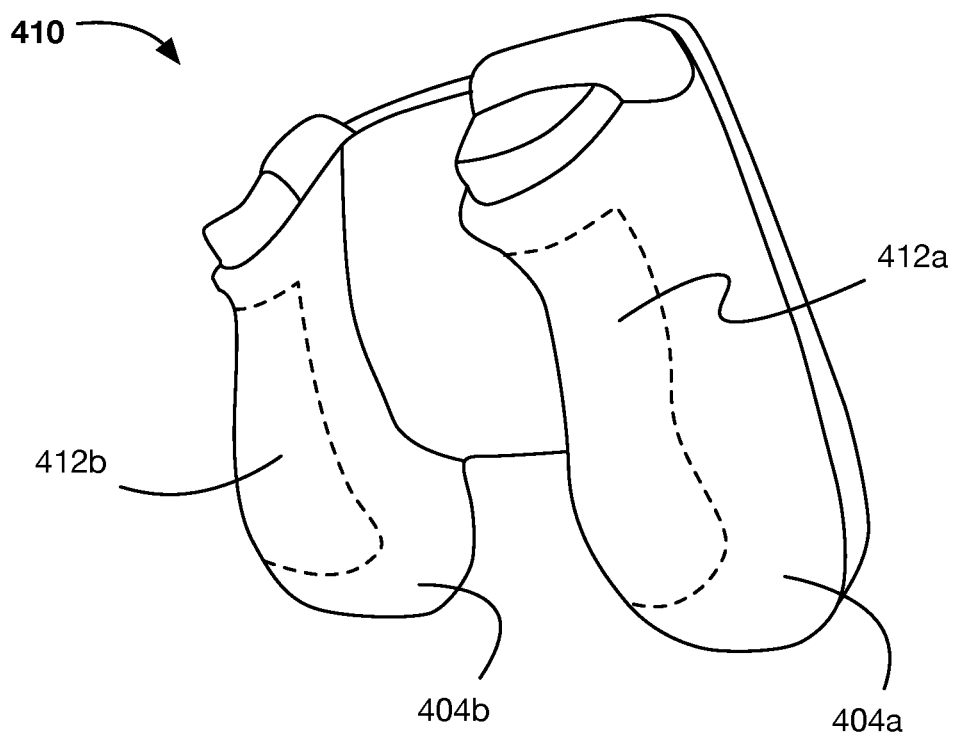
FIG. 24 is a rear perspective view of the handheld gaming apparatus of FIG. 23, according to an exemplary embodiment
Figure 25:
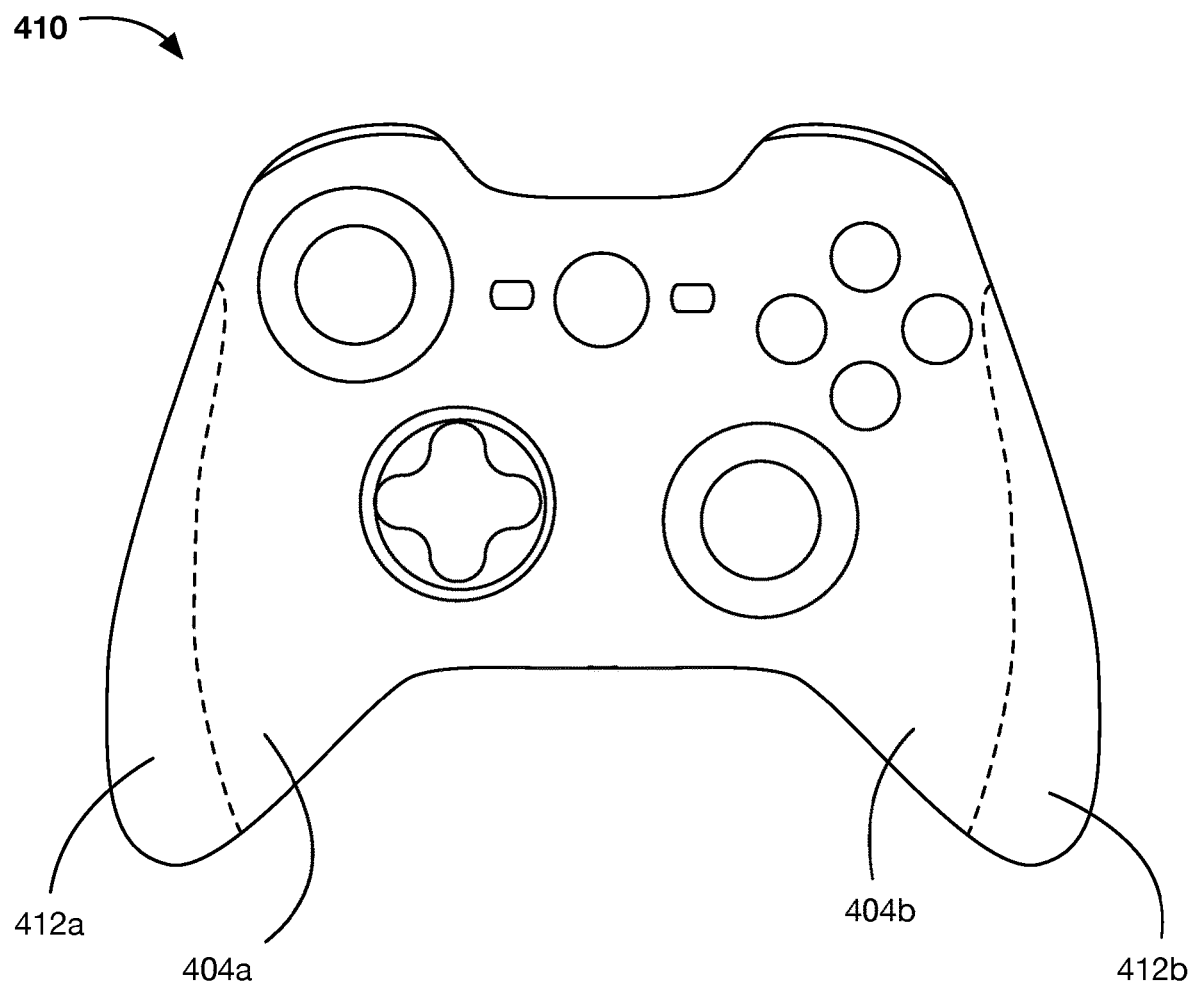
FIG. 25 is a top view of another handheld gaming apparatus, according to an exemplary embodiment.

The implementations of pedal systems 412 illustrated in FIGS. 21-22 cover substantially all of the rear surface of each wing 404 of the handheld gaming apparatus 410. FIGS. 23-24 illustrate a side view and rear perspective view of another similar embodiment of a handheld gaming apparatus having smaller pedal systems or sensors 412. Additionally, FIG. 25 is a top view of another handheld gaming apparatus having a pedal system or sensor 412 that wraps around onto a top surface of each wing 404, according to some implementations. As shown, the sensors 412 may cover lateral portions of each wing, such that they may be engaged by a user's palms during use. In some implementations, these sensors may provide a single control each (e.g. lateral movement or other controls or commands), trading the multiple functions of the implementations of FIGS. 17-25 for a larger and potentially easier to engage surface.

Additionally, as discussed above in connection with FIGS. 19-20, in some implementations, pedal systems incorporating non-moving sensors such as resistive or capacitive or optical sensors may include ridges or other textured elements to allow a user to distinguish between the sensor and a surrounding surface of the controller by touch. Similarly, as discussed above, a haptic feedback element may be utilized to inform the user when the sensor or control has been engaged, such as a linear or rotational motor and weight system, triggered responsive to detection of a touch of the sensor. In some implementations, the haptic feedback element may be separate from or integrated with other haptic feedback elements within the controller (e.g. rotational motors and unbalanced weights positioned within each wing of the controller).

Accordingly, pedal systems 100, 412 may comprise physical levers or tactile surfaces or other sensors, and may be utilized on any type and form of gaming apparatus, including handheld controllers, "blasters", or other controllers, such as single-hand controllers (sometimes referred to as "wands" or "remotes"). In addition, although primarily discussed in terms of gaming controllers, pedal systems 100, 412 may be implemented on any device for which one or more analog or digital controls may be utilized to provide control or commands. For examples, a pedal system 100, 412 may be implemented in a steering wheel of an automobile (e.g. on a rear portion of the wheel and positioned under a driver's fingers in a typical driving position); on a handle of a home maintenance apparatus (e.g. snowblower or lawnmower, for example, providing forward and backward control over a motor or control of other functions); or any other type and form of device.

Accordingly, in some aspects, the present disclosure is directed to a handheld controller for a gaming device. The handheld controller includes a central body portion; a pair of side portions adjacent to the central body portion and on opposing sides of the central body portion, each side portion having a rear facing surface; a pair of pedal systems, each disposed within a corresponding side portion, each pedal system including a pedal disposed along the rear facing surface of the side portion, wherein the pedal has a first end and an opposing second end spaced from the first end, and wherein the pedal is coupled to a pivot point within the corresponding side portion such that the pedal is selectively pivotable between (i) a nominal position, (ii) a first position in response to the pedal being pivoted in a first direction about the pivot point, and (iii) a second position in response to the pedal being pivoted in an opposing second direction about the pivot point; and a communications interface configured to facilitate transmitting inputs to a gaming device based on a current position of the pedal.

In some implementations, the pedal system further includes a first position detector positioned on a first side of the pivot point and configured to detect when the pedal is selectively pivoted into the first position; and a second position detector positioned on an opposing second side of the pivot point and configured to detect when the pedal is selectively pivoted into the second position. In a further implementation, the first position detector and the second position detector are analog potentiometers. In another further implementation, the pedal system further includes a third position detector positioned on the first side of the pivot point between the first position detector and the pivot point. In a still further implementation, the third position detector is configured to detect when the pedal is selectively pivoted about the pivot point into a third position beyond the first position.

In some implementations, the pedal system further includes a resilient element positioned to bias the pedal into the nominal position. In a further implementation, the resilient element is a torsion spring. In another further implementation, the resilient element is a first resilient element positioned proximate the first end of the pedal, further comprising a second resilient element positioned proximate the opposing second end of the pedal. In a still further implementation, the first resilient element and the second resilient element are linear springs.

In some implementations, the communications interface includes a wireless communication device configured to facilitate at least one of (i) wirelessly transmitting the inputs to the gaming device or (ii) wirelessly receiving an indication regarding a characteristic within a game operated by the gaming device from the gaming device.

In another aspect, the present disclosure is directed to a gaming controller for a gaming device. The gaming controller includes a body portion; at least one handgrip adjacent to the body portion, each of the at least one handgrips having a rear facing surface; a pedal system disposed within each of the at least one handgrips, each pedal system including a pedal disposed along the rear facing surface of the handgrip, wherein the pedal has a first end and an opposing second end spaced from the first end, and wherein the pedal is coupled to a pivot point within the corresponding side portion such that the pedal is selectively pivotable between (i) a nominal position, (ii) a first position in response to the pedal being pivoted in a first direction about the pivot point, and (iii) a second position in response to the pedal being pivoted in an opposing second direction about the pivot point; and a communications interface configured to facilitate transmitting inputs to a gaming device based on a current position of the pedal.

In some implementations, the pedal system further includes a position detector configured to detect the current position of the pedal. In a further implementation, the pedal system further includes a resilient element positioned to bias the pedal into a nominal position. In a still further implementation, the resilient element is a torsion spring. In another still further implementation, the resilient element is a first resilient element positioned proximate the first end of the pedal, further comprising a second resilient element positioned proximate the opposing second end of the pedal. In a yet still further implementation, the first resilient element and the second resilient element are linear springs.

In yet another aspect, the present disclosure is directed to a gaming controller for a gaming device. The gaming controller includes a body portion; at least one handgrip adjacent to the body portion, each of the at least one handgrips having a rear facing surface; a pedal system disposed within each of the at least one handgrips, each pedal system including a tactile sensor disposed along the rear facing surface of the handgrip, wherein the tactile sensor has a first end and an opposing second end spaced from the first end, and wherein the tactile sensor is configured to detect a contact at (i) a first position proximate to the first end, and (ii) a second position proximate to the second end; and a communications interface configured to provide (i) a first signal to a gaming device responsive to detection of a contact at the first position, and (ii) a second signal to the gaming device responsive to detection of a contact at the second position.

In some implementations, the tactile sensor comprises a resistive sensor. In some implementations, the tactile sensor comprises a capacitive sensor. In some implementations, the tactile sensor is flush with the rear facing surface of the handgrip.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the gaming apparatus 2, the gaming controller 10, and the pedal system 100 as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A handheld controller for a gaming device, the handheld controller comprising:
    a central body portion;
    a pair of side portions adjacent to the central body portion and on opposing sides of the central body portion, each side portion having a rear facing surface;
    a first pedal, disposed along the rear facing surface of a first side portion of the pair of side portions, coupled to a pivot point within the first side portion such that the first pedal is selectively pivotable between at least (i) a nominal position, (ii) a first position in response to the first pedal being pivoted in a first direction about the pivot point, and (iii) a second position in response to the first pedal being pivoted in the first direction about the pivot point beyond the first position;
    a first position detector positioned on a first side of the pivot point; and
    a second position detector positioned on the first side of the pivot point between the first position detector and the pivot point; and
    wherein the first position detector is configured to detect when the first pedal is selectively pivoted into the first position; and wherein the second position detector is configured to detect when the first pedal is selectively pivoted about the pivot point into the second position beyond the first position.

2. The handheld controller of claim 1, wherein the first pedal is further selectively pivotable into (iv) a third position in response to the pedal being pivoted in an opposing second direction about the pivot point.

3. The handheld controller of claim 2, further comprising a third position detector positioned on an opposing second side of the pivot point and configured to detect when the pedal is selectively pivoted into the third position.

4. The handheld controller of claim 1, further comprising a second pedal disposed along the rear facing surface of a second side portion of the pair of side portions.

5. The handheld controller of claim 1, further comprising a haptic feedback element configured to be triggered responsive to the second position detector detecting when the first pedal is selectively pivoted about the pivot point into the second position beyond the first position.

6. The handheld controller of claim 1, wherein the first side portion has a curved profile; and wherein the first pedal has a corresponding curved profile such that the first pedal is substantially parallel to the first side portion when in the nominal position.

7. The handheld controller of claim 1, wherein the first pedal is oriented laterally across the first side portion.

8. The handheld controller of claim 1, wherein the first pedal is oriented longitudinally along the first side portion.

9. The handheld controller of claim 1, further comprising a resilient element positioned to bias the first pedal into the nominal position.

10. The handheld controller of claim 9, wherein the resilient element is a torsion spring.

11. The handheld controller of claim 9, wherein the resilient element is a first resilient element positioned proximate the first end of the first pedal; and further comprising a second resilient element positioned proximate the opposing second end of the first pedal.

12. The handheld controller of claim 11, wherein the first resilient element and the second resilient element are linear springs.

13. The handheld controller of claim 1, further comprising a communications interface configured to facilitate transmitting inputs to a gaming device based on a current position of the first pedal.

14. The handheld controller of claim 13, wherein the communications interface includes a wireless communication device configured to facilitate at least one of (i) wirelessly transmitting the inputs to the gaming device or (ii) wirelessly receiving an indication regarding a characteristic within a game operated by the gaming device from the gaming device.

15. A handheld controller for a gaming device, the handheld controller comprising:
    a central body portion;
    a pair of side portions adjacent to the central body portion and on opposing sides of the central body portion, each side portion having a rear facing surface;
    a first pedal, disposed along the rear facing surface of a first side portion of the pair of side portions, coupled to a pivot point within the first side portion such that the first pedal is selectively pivotable between at least (i) a nominal position, (ii) a first position in response to the first pedal being pivoted in a first direction about the pivot point, and (iii) a second position in response to the first pedal being pivoted in the first direction about the pivot point beyond the first position;
    a first position detector positioned on a first side of the pivot point, wherein the first position detector is an analog potentiometer; and
    a second position detector positioned on the first side of the pivot point between the first position detector and the pivot point.

16. The handheld controller of claim 15, wherein the second position detector is a switch.

17. The handheld controller of claim 16, wherein the switch comprises a resilient portion or detent configured to provide physical feedback when the switch is engaged.

18. The handheld controller of claim 17, wherein the resilient portion or detent provides physical feedback when the first pedal is selectively pivoted about the pivot point into the second position beyond the first position.

19. A handheld controller for a gaming device, the handheld controller comprising:
    a central body portion;
    a pair of side portions adjacent to the central body portion and on opposing sides of the central body portion, each side portion having a rear facing surface;
    a first pedal, disposed along the rear facing surface of a first side portion of the pair of side portions, coupled to a pivot point within the first side portion such that the first pedal is selectively pivotable between at least (i) a nominal position, (ii) a first position in response to the first pedal being pivoted in a first direction about the pivot point, and (iii) a second position in response to the first pedal being pivoted in the first direction about the pivot point beyond the first position;
    a first position detector positioned on a first side of the pivot point; and
    a second position detector positioned on the first side of the pivot point between the first position detector and the pivot point;

wherein the first side portion has a curved profile, and wherein the first pedal has a corresponding curved profile such that the first pedal is substantially parallel to the first side portion when in the nominal position, and wherein the first position detector and second position detector are positioned within the first side portion at depths varying according to the curved profile of the first side portion.

* * * * *